US012695482B2

(12) United States Patent
Hanson et al.

(10) Patent No.: US 12,695,482 B2
(45) Date of Patent: Jul. 28, 2026

(54) DISTRIBUTED ANTENNA SYSTEM MULTIPLE DELAY SUPPORT

(71) Applicant: Outdoor Wireless Networks LLC, Claremont, NC (US)

(72) Inventors: Van Erick Hanson, Forest, VA (US); Steven B. Stuart, Eden Prairie, MN (US)

(73) Assignee: Outdoor Wireless Networks LLC, Richardson, TX (US)

( * ) Notice: Subject to any disclaimer, the term of this patent is extended or adjusted under 35 U.S.C. 154(b) by 27 days.

(21) Appl. No.: 18/759,070

(22) Filed: Jun. 28, 2024

(65) Prior Publication Data

US 2025/0038789 A1     Jan. 30, 2025

Related U.S. Application Data

(60) Provisional application No. 63/515,543, filed on Jul. 25, 2023.

(51) Int. Cl.
*H04B 7/02* (2018.01)
*H04B 7/024* (2017.01)

(52) U.S. Cl.
CPC .................................... *H04B 7/024* (2013.01)

(58) Field of Classification Search
CPC ...................................................... H04B 7/024
See application file for complete search history.

(56) References Cited

U.S. PATENT DOCUMENTS

| | | | | |
|---|---|---|---|---|
| 11,051,321 B2 * | 6/2021 | Moon | ............... | H04W 56/0015 |
| 2024/0322907 A1 * | 9/2024 | Dobashi | ................ | H04B 10/29 |
| 2024/0357530 A1 * | 10/2024 | Liang | ................ | H04W 56/0045 |
| 2024/0421907 A1 * | 12/2024 | Murakami | ............ | H04W 16/26 |

* cited by examiner

*Primary Examiner* — Dac V Ha
(74) *Attorney, Agent, or Firm* — Fogg & Powers LLC

(57) ABSTRACT

Techniques related to accommodating multiple delay targets in a distributed antenna system are described. The distributed antenna system is configured to determine at least one equalized delay value for a plurality of remote units based on each of a plurality of delay targets. The distributed antenna system also controls signals transmission times of at least one node based on the at least one delay value so that downlink radio frequency signals are transmitted from each of the remote units with a total delay that satisfies each of the delay targets.

20 Claims, 8 Drawing Sheets

800

802

Determine a plurality of delay targets for the DAS

804

Determine at least one equalized delay value for each of a plurality of remote units based on each of the plurality of delay targets

806

Control signal transmission times of one or more nodes of the DAS to transmit downlink signals from each of a plurality of remote units

DISTRIBUTED ANTENNA SYSTEM MULTIPLE DELAY SUPPORT

CROSS-REFERENCE TO RELATED APPLICATIONS

This application claims the benefit of U.S. Provisional Application Ser. No. 63/515,543, filed on Jul. 25, 2024, and titled "DISTRIBUTED ANTENNA SYSTEM MULTIPLE DELAY SUPPORT", the contents of which are incorporated herein in their entirety.

BACKGROUND

A distributed antenna system (DAS) typically includes one or more master units that are communicatively coupled to a plurality of remotely located access points or antenna units (also referred to here as "radio units"), where each access point can be coupled directly to one or more of the mater units or indirectly via one or more other remote units and/or via one or more intermediary or expansion units or nodes. A DAS is typically used to improve the coverage provided by one or more base stations that are coupled to the central access nodes. These base stations can be coupled to the one or more master units via one or more cables or via a wireless connection, for example, using one or more donor antennas. The wireless service provided by the base stations can include commercial cellular service and/or private or public safety wireless communications. A DAS is typically utilized by multiple carriers providing wireless service, in which each carrier provides wireless signals in one or more coverage areas supported by the DAS.

Signals do not propagate instantaneously in the DAS. Instead, a DAS experiences a delay associated with transmitting a signal from one entity of the DAS to another entity of the DAS. For remotely located DAS entities, the delays associated with signal propagation can be significant. Additionally, the delays between different signal pathways in the DAS may differ, thereby causing the signals to reach the radio units at different times, even when the signals originate from the same entity.

SUMMARY

The details of one or more embodiments are set forth in the description below. The features illustrated or described in connection with one exemplary embodiment may be combined with the features of other embodiments. Thus, any of the various embodiments described herein can be combined to provide further embodiments. Aspects of the embodiments can be modified, if necessary to employ concepts of the various patents, applications and publications as identified herein to provide yet further embodiments.

In one embodiment, a distributed antenna system is disclosed. The distributed antenna system comprises at least one master unit. The at least one master unit is configured to receive downlink signals from at least one base station entity. The at least one master unit is configured to generate downlink transport signals based on the downlink signals. The distributed antenna system comprises a plurality of remote units communicatively coupled to the at least one master unit. The plurality of remote units is configured to generate downlink radio frequency (RF) signals based on the downlink transport signals. The plurality of remote units is configured to radiate the downlink RF signals to user equipment in at least one coverage zone. The distributed antenna system is configured to determine a plurality of delay targets for the distributed antenna system. The distributed antenna system is configured to determine at least one equalized delay value for each of the plurality of remote units based on each of the plurality of delay targets. The distributed antenna system is configured to control signal transmission times of at least one node of the distributed antenna system based on the at least one equalized delay value so that the downlink RF signals are transmitted from each of the plurality of remote units with a total delay that satisfies each of the plurality of delay targets.

In another embodiment, a method for transmitting downlink radio frequency (RF) signals in a distributed antenna system is disclosed. The distributed antenna system comprises at least one master unit communicatively coupled to a plurality of remote units. The method comprises determining a plurality of delay targets for the distributed antenna system. The method comprises determining at least one equalized delay value for each of the plurality of remote units based on each of the plurality of delay targets. The method comprises controlling signal transmission times of at least one node of the distributed antenna system based on the at least one equalized delay value so that the downlink RF signals are transmitted from each of the plurality of remote units with a total delay that satisfies each of the plurality of delay targets.

In yet another embodiment, a program product is disclosed. The program product comprises a non-transitory processor-readable medium on which program instructions, configured to be executed by at least one processor, are embodied. By executing the program instructions, the at least one processor is configured to determine a plurality of delay targets for a distributed antenna system. The distributed antenna system comprises at least one master unit communicatively coupled to a plurality of remote units. The at least one processor is configured to determine at least one equalized delay value for each of the plurality of remote units based on each of the plurality of delay targets. The at least one processor is configured to control signal transmission times of at least one node of the distributed antenna system based on the at least one equalized delay value so that downlink RF signals are transmitted from each of the plurality of remote units with a total delay that satisfies each of the plurality of delay targets.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, as briefly described as follows and as described in the accompanying detailed description.

Figure 1:
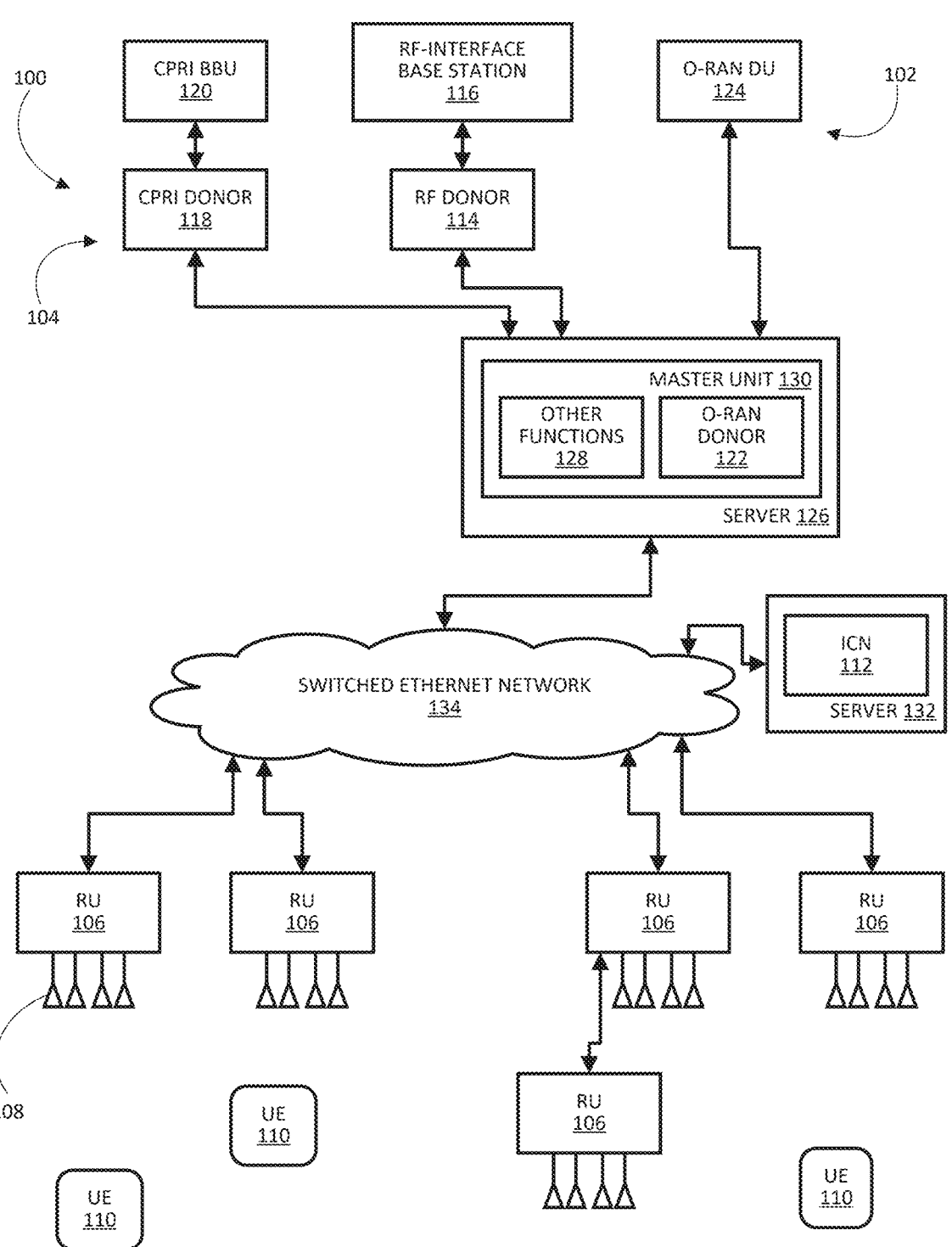
FIGS. 1-4 depict block diagrams of exemplary systems configured to provide wireless service to user equipment, as described in one or more embodiments.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

FIG. 1 is a block diagram illustrating an exemplary embodiment of a distributed antenna system (DAS) 100 that is configured to serve one or more base stations 102. In the exemplary embodiment shown in FIG. 1, the DAS 100 includes one or more donor units 104 that are used to couple the DAS 100 to the base stations 102. The DAS 100 also includes a plurality of remotely located radio units (RUs) 106 (also referred to as "antenna units," "access points," "remote units," or "remote antenna units"). The RUs 106 are communicatively coupled to the donor units 104.

Each RU 106 includes, or is otherwise associated with, a respective set of coverage antennas 108 via which downlink analog RF signals can be radiated to user equipment (UEs) 110 and via which uplink analog RF signals transmitted by UEs 110 can be received. The DAS 100 is configured to serve each base station 102 using a respective subset of RUs 106 (which may include less than all of the RUs 106 of the DAS 100). Also, the subsets of RUs 106 used to serve the base stations 102 may differ from base station 102 to base station 102. The subset of RUs points 106 used to serve a given base station 102 is also referred to here as the "simulcast zone" for that base station 102. In general, the wireless coverage of a base station 102 served by the DAS 100 is improved by radiating a set of downlink RF signals for that base station 102 from the coverage antennas 108 associated with the multiple RUs 106 in that base station's simulcast zone and by producing a single "combined" set of uplink base station signals or data that is provided to that base station 102. The single combined set of uplink base station signals or data is produced by a combining or summing process that uses inputs derived from the uplink RF signals received via the coverage antennas 108 associated with the RUs 106 in that base station's simulcast zone.

The DAS 100 can also include one or more intermediary combining nodes (ICNs) 112 (also referred to as "expansion" units or nodes). For each base station 102 served by a given ICN 112, the ICN 112 is configured to receive a set of uplink transport data for that base station 102 from a group of "southbound" entities (that is, from RUs 106 and/or other ICNs 112) and generate a single set of combined uplink transport data for that base station 102, which the ICN 112 transmits "northbound" towards the donor unit 104 serving that base station 102. The single set of combined uplink transport data for each served base station 102 is produced by a combining or summing process that uses inputs derived from the uplink RF signals received via the coverage antennas 108 of any southbound RUs 106 included in that base station's simulcast zone. As used here, "southbound" refers to traveling in a direction "away," or being relatively "farther," from the donor units 104 and base stations 102, and "northbound" refers to traveling in a direction "towards", or being relatively "closer" to, the donor units 104 and base stations 102.

In some configurations, each ICN 112 also forwards downlink transport data to the group of southbound RUs 106 and/or ICNs 112 served by that ICN 112. Generally, ICNs 112 can be used to increase the number of RUs 106 that can be served by the donor units 104 while reducing the processing and bandwidth load relative to having the additional RUs 106 communicate directly with each such donor unit 104.

Also, one or more RUs 106 can be configured in a "daisy-chain" or "ring" configuration in which transport data for at least some of those RUs 106 is communicated via at least one other RU 106. Each RU 106 would also perform the combining or summing process for any base station 102 that is served by that RU 106 and one or more of the southbound entities subtended from that RU 106. (Such a RU 106 also forwards northbound all other uplink transport data received from its southbound entities.)

The DAS 100 can include various types of donor units 104. One example of a donor unit 104 is an RF donor unit 114 that is configured to couple the DAS 100 to a base station 116 using the external analog radio frequency (RF) interface of the base station 116 that would otherwise be used to couple the base station 116 to one or more antennas (if the DAS 100 were not being used). This type of base station 116 is also referred to here as an "RF-interface" base station 116. An RF-interface base station 116 can be coupled to a corresponding RF donor unit 114 by coupling each antenna port of the base station 116 to a corresponding port of the RF donor unit 114.

Each RF donor unit 114 serves as an interface between each served RF-interface base station 116 and the rest of the DAS 100 and receives downlink base station signals from, and outputs uplink base station signals to, each served RF-interface base station 116. Each RF donor unit 114 performs at least some of the conversion processing necessary to convert the base station signals to and from the digital fronthaul interface format natively used in the DAS 100 for communicating time-domain baseband data. The downlink and uplink base station signals communicated between the RF-interface base station 116 and the donor unit 114 are analog RF signals. Also, in this example, the digital fronthaul interface format natively used in the DAS 100 for communicating time-domain baseband data can comprise the O-RAN fronthaul interface, a CPRI or enhanced CPRI (eCPRI) digital fronthaul interface format, or a proprietary digital fronthaul interface format (though other digital fronthaul interface formats can also be used).

Another example of a donor unit 104 is a digital donor unit that is configured to communicatively couple the DAS 100 to a baseband entity using a digital baseband fronthaul interface that would otherwise be used to couple the baseband entity to a radio unit (if the DAS 100 were not being used). In the example shown in FIG. 1, two types of digital donor units are shown.

The first type of digital donor unit comprises a digital donor unit 118 that is configured to communicatively couple the DAS 100 to a baseband unit (BBU) 120 using a time-domain baseband fronthaul interface implemented in accordance with a Common Public Radio Interface ("CPRI") specification. This type of digital donor unit 118 is also referred to here as a "CPRI" donor unit 118, and this type of BBU 120 is also referred to here as a CPRI BBU 120. For each CPRI BBU 120 served by a CPRI donor unit 118, the CPRI donor unit 118 is coupled to the CPRI BBU 120 using the CPRI digital baseband fronthaul interface that would otherwise be used to couple the CPRI BBU 120 to a CPRI remote radio head (RRH) (if the DAS 100 were not being used). A CPRI BBU 120 can be coupled to a corresponding CPRI donor unit 118 via a direct CPRI connection.

Each CPRI donor unit 118 serves as an interface between each served CPRI BBU 120 and the rest of the DAS 100 and receives downlink base station signals from, and outputs uplink base station signals to, each CPRI BBU 120. Each CPRI donor unit 118 performs at least some of the conversion processing necessary to convert the CPRI base station data to and from the digital fronthaul interface format natively used in the DAS 100 for communicating time-domain baseband data. The downlink and uplink base station signals communicated between each CPRI BBU 120 and the CPRI donor unit 118 comprise downlink and uplink fronthaul data generated and formatted in accordance with the CPRI baseband fronthaul interface.

The second type of digital donor unit comprises a digital donor unit 122 that is configured to communicatively couple the DAS 100 to a BBU 124 using a frequency-domain baseband fronthaul interface implemented in accordance with a O-RAN Alliance specification. The acronym "O-RAN" is an abbreviation for "Open Radio Access Network." This type of digital donor unit 122 is also referred to here as an "O-RAN" donor unit 122, and this type of BBU 124 is typically an O-RAN distributed unit (DU) and is also referred to here as an O-RAN DU 124. For each O-RAN DU 124 served by a O-RAN donor unit 122, the O-RAN donor unit 122 is coupled to the O-DU 124 using the O-RAN digital baseband fronthaul interface that would otherwise be used to couple the O-RAN DU 124 to a O-RAN RU (if the DAS 100 were not being used). An O-RAN DU 124 can be coupled to a corresponding O-RAN donor unit 122 via a switched Ethernet network. Alternatively, an O-RAN DU 124 can be coupled to a corresponding O-RAN donor unit 122 via a direct Ethernet or CPRI connection.

Each O-RAN donor unit 122 serves as an interface between each served O-RAN DU 124 and the rest of the DAS 100 and receives downlink base station signals from, and outputs uplink base station signals to, each O-RAN DU 124. Each O-RAN donor unit 122 performs at least some of any conversion processing necessary to convert the base station signals to and from the digital fronthaul interface format natively used in the DAS 100 for communicating frequency-domain baseband data. The downlink and uplink base station signals communicated between each O-RAN DU 124 and the O-RAN donor unit 122 comprise downlink and uplink fronthaul data generated and formatted in accordance with the O-RAN baseband fronthaul interface, where the user-plane data comprises frequency-domain baseband IQ data. Also, in this example, the digital fronthaul interface format natively used in the DAS 100 for communicating O-RAN fronthaul data is the same O-RAN fronthaul interface used for communicating base station signals between each O-RAN DU 124 and the O-RAN donor unit 122, and the "conversion" performed by each O-RAN donor unit 122 (and/or one or more other entities of the DAS 100) includes performing any needed "multicasting" of the downlink data received from each O-RAN DU 124 to the multiple RUs 106 in a simulcast zone for that O-RAN DU 124 (for example, by communicating the downlink fronthaul data to an appropriate multicast address and/or by copying the downlink fronthaul data for communication over different fronthaul links) and performing any needed combining or summing of the uplink data received from the RUs 106 to produce combined uplink data provided to the O-RAN DU 124. It is to be understood that other digital fronthaul interface formats can also be used.

In general, the various base stations 102 are configured to communicate with a core network (not shown) of the associated wireless operator using an appropriate backhaul network (typically, a public wide area network such as the Internet). Also, the various base stations 102 may be from multiple, different wireless operators and/or the various base stations 102 may support multiple, different wireless protocols and/or RF bands.

In general, for each base station 102, the DAS 100 is configured to receive a set of one or more downlink base station signals from the base station 102 (via an appropriate donor unit 104), generate downlink transport data derived from the set of downlink base station signals, and transmit the downlink transport data to the RUs 106 in the base station's simulcast zone. For each base station 102 served by a given RU 106, the RU 106 is configured to receive the downlink transport data transmitted to it via the DAS 100 and use the received downlink transport data to generate one or more downlink analog radio frequency signals that are radiated from one or more coverage antennas 108 associated with that RU 106 for reception by user equipment 110. In this way, the DAS 100 increases the coverage area for the downlink capacity provided by the base stations 102. Also, for any southbound entities (for example, southbound RUs 106 or ICNs 112) coupled to the RU 106 (for example, in a daisy chain or ring architecture), the RU 106 forwards any downlink transport data intended for those southbound entities towards them.

For each base station 102 served by a given RU 106, the RU 106 is configured to receive one or more uplink radio frequency signals transmitted from the user equipment 110. These signals are analog radio frequency signals and are received via the coverage antennas 108 associated with that RU 106. The RU 106 is configured to generate uplink transport data derived from the one or more remote uplink radio frequency signals received for the served base station 102 and transmit the uplink transport data northbound towards the donor unit 104 coupled to that base station 102.

For each base station 102 served by the DAS 100, a single "combined" set of uplink base station signals or data is produced by a combining or summing process that uses inputs derived from the uplink RF signals received via the RUs 106 in that base station's simulcast zone. The resulting final single combined set of uplink base station signals or data is provided to the base station 102. This combining or summing process can be performed in a centralized manner in which the combining or summing process is performed by a single unit of the DAS 100 (for example, a donor unit 104 or master unit 130). This combining or summing process can also be performed in a distributed or hierarchical manner in which the combining or summing process is performed by multiple units of the DAS 100 (for example, a donor unit 104 or master unit 130 and one or more ICNs 112 and/or RUs 106). Each unit of the DAS 100 that performs the combining or summing process for a given base station 102 receives uplink transport data from that unit's southbound entities and uses that data to generate combined uplink transport data, which the unit transmits northbound towards the base station 102. The generation of the combined uplink transport data involves, among other things, extracting in-phase and quadrature (IQ) data from the received uplink transport data and performing a combining or summing process using any uplink IQ data for that base station 102 in order to produce combined uplink IQ data.

Some of the details regarding how base station signals or data are communicated and transport data is produced vary based on which type of base station 102 is being served. In the case of an RF-interface base station 116, the associated RF donor unit 114 receives analog downlink RF signals from the RF-interface base station 116 and, either alone or in combination with one or more other units of the DAS 100, converts the received analog downlink RF signals to the digital fronthaul interface format natively used in the DAS 100 for communicating time-domain baseband data (for example, by digitizing, digitally down-converting, and filtering the received analog downlink RF signals in order to produce digital baseband IQ data and formatting the resulting digital baseband IQ data into packets) and communicates the resulting packets of downlink transport data to the various RUs 106 in the simulcast zone of that base station 116. The RUs 106 in the simulcast zone for that base station 116 receive the downlink transport data and use it to generate and radiate downlink RF signals as described above. In the uplink, either alone or in combination with one or more other units of the DAS 100, the RF donor unit 114 generates a set of uplink base station signals from uplink transport data received by the RF donor unit 114 (and/or the other units of the DAS 100 involved in this process). The set of uplink base station signals is provided to the served base station 116. The uplink transport data is derived from the uplink RF signals received at the RUs 106 in the simulcast zone of the served base station 116 and communicated in packets.

In the case of a CPRI BBU 120, the associated CPRI digital donor unit 118 receives CPRI downlink fronthaul data from the CPRI BBU 120 and, either alone or in combination with another unit of the DAS 100, converts the received CPRI downlink fronthaul data to the digital fronthaul interface format natively used in the DAS 100 for communicating time-domain baseband data (for example, by re-sampling, synchronizing, combining, separating, gain adjusting, etc. the CPRI baseband IQ data, and formatting the resulting baseband IQ data into packets), and communicates the resulting packets of downlink transport data to the various RUs 106 in the simulcast zone of that CPRI BBU 120. The RUs 106 in the simulcast zone of that CPRI BBU 120 receive the packets of downlink transport data and use them to generate and radiate downlink RF signals as described above. In the uplink, either alone or in combination with one or more other units of the DAS 100, the CPRI donor unit 118 generates uplink base station data from uplink transport data received by the CPRI donor unit 118 (and/or the other units of the DAS 100 involved in this process). The resulting uplink base station data is provided to that CPRI BBU 120. The uplink transport data is derived from the uplink RF signals received at the RUs 106 in the simulcast zone of the CPRI BBU 120.

In the case of an O-RAN DU 124, the associated O-RAN donor unit 122 receives packets of O-RAN downlink fronthaul data (that is, O-RAN user-plane and control-plane messages) from each O-RAN DU 124 coupled to that O-RAN digital donor unit 122 and, either alone or in combination with another unit of the DAS 100, converts (if necessary) the received packets of O-RAN downlink fronthaul data to the digital fronthaul interface format natively used in the DAS 100 for communicating O-RAN baseband data and communicates the resulting packets of downlink transport data to the various RUs 106 in a simulcast zone for that O-RAN DU 124. The RUs 106 in the simulcast zone of each O-RAN DU 124 receive the packets of downlink transport data and use them to generate and radiate downlink RF signals as described above. In the uplink, either alone or in combination with one or more other units of the DAS 100, the O-RAN donor unit 122 generates packets of uplink base station data from uplink transport data received by the O-RAN donor unit 122 (and/or the other units of the DAS 100 involved in this process). The resulting packets of uplink base station data are provided to the O-RAN DU 124. The uplink transport data is derived from the uplink RF signals received at the RUs 106 in the simulcast zone of the served O-RAN DU 124 and communicated in packets.

In one implementation, one of the units of the DAS 100 is also used to implement a "master" timing entity for the DAS 100 (for example, such a master timing entity can be implemented as a part of a master unit 130 described below). In another example, a separate, dedicated timing master entity (not shown) is provided within the DAS 100. In either case, the master timing entity synchronizes itself to an external timing master entity (for example, a timing master associated with one or more of the O-DUs 124) and, in turn, that entity serves as a timing master entity for the other units of the DAS 100. A time synchronization protocol (for example, the Institute of Electrical and Electronics Engineers (IEEE) 1588 Precision Time Protocol (PTP), the Network Time Protocol (NTP), or the Synchronous Ethernet (SyncE) protocol) can be used to implement such time synchronization.

A management system can be used to manage the various nodes of the DAS 100. In one implementation, the management system communicates with a predetermined "master" entity for the DAS 100 (for example, the master unit 130 described below), which in turns forwards or otherwise communicates with the other units of the DAS 100 for management-plane purposes. In another implementation, the management system communicates with the various units of the DAS 100 directly for management-plane purposes (that is, without using a master entity as a gateway).

Each base station 102 (including each RF-interface base station 116, CPRI BBU 120, and O-RAN DU 124), donor unit 104 (including each RF donor unit 114, CPRI donor unit 118, and O-RAN donor unit 122), RU 106, ICN 112, and any of the specific features described here as being implemented thereby, can be implemented in hardware, software, or combinations of hardware and software, and the various implementations (whether hardware, software, or combinations of hardware and software) can also be referred to generally as "circuitry," a "circuit," or "circuits" that is or are configured to implement at least some of the associated functionality. When implemented in software, such software can be implemented in software or firmware executing on one or more suitable programmable processors (or other programmable device) or configuring a programmable device (for example, processors or devices included in or used to implement special-purpose hardware, general-purpose hardware, and/or a virtual platform). In such a software example, the software can comprise program instructions that are stored (or otherwise embodied) on or in an appropriate non-transitory storage medium or media (such as flash or other non-volatile memory, magnetic disc drives, and/or optical disc drives) from which at least a portion of the program instructions are read by the programmable processor or device for execution thereby (and/or for otherwise configuring such processor or device) in order for the processor or device to perform one or more functions described here as being implemented the software. Such hardware or software (or portions thereof) can be implemented in other ways (for example, in an application specific integrated circuit (ASIC), etc.). Such entities can be implemented in other ways.

The DAS 100 can be implemented in a virtualized manner or a non-virtualized manner. When implemented in a virtualized manner, one or more nodes, units, or functions of the DAS 100 are implemented using one or more virtual network functions (VNFs) executing on one or more physical server computers (also referred to here as "physical servers" or just "servers") (for example, one or more commercial-off-the-shelf (COTS) servers of the type that are deployed in data centers or "clouds" maintained by enterprises, communication service providers, or cloud services providers). More specifically, in the exemplary embodiment shown in FIG. 1, each O-RAN donor unit 122 is implemented as a VNF running on a server 126. The server 126 can execute other VNFs 128 that implement other functions for the DAS 100 (for example, fronthaul, management plane, and synchronization plane functions). The various VNFs executing on the server 126 are also referred to here as "master unit" functions 130 or, collectively, as the "master unit" 130. Also, in the exemplary embodiment shown in FIG. 1, each ICN 112 is implemented as a VNF running on a server 132.

The RF donor units 114 and CPRI donor units 118 can be implemented as cards (for example, Peripheral Component Interconnect (PCI) Cards) that are inserted in the server 126. Alternatively, the RF donor units 114 and CPRI donor units 118 can be implemented as separate devices that are coupled to the server 126 via dedicated Ethernet links or via a switched Ethernet network (for example, the switched Ethernet network 134 described below).

In the exemplary embodiment shown in FIG. 1, the donor units 104, RUs 106 and ICNs 112 are communicatively coupled to one another via a switched Ethernet network 134. Also, in the exemplary embodiment shown in FIG. 1, an O-RAN DU 124 can be coupled to a corresponding O-RAN donor unit 122 via the same switched Ethernet network 134 used for communication within the DAS 100 (though each O-RAN DU 124 can be coupled to a corresponding O-RAN donor unit 122 in other ways). In the exemplary embodiment shown in FIG. 1, the downlink and uplink transport data communicated between the units of the DAS 100 is formatted as O-RAN data that is communicated in Ethernet packets over the switched Ethernet network 134. In the exemplary embodiment shown in FIG. 1, the RF donor units 114 and CPRI donor units 118 are coupled to the RUs 106 and ICNs 112 via the master unit 130.

In the downlink, the RF donor units 114 and CPRI donor units 118 provide downlink time-domain baseband IQ data to the master unit 130. The master unit 130 generates downlink O-RAN user-plane messages containing downlink baseband IQ that is either the time-domain baseband IQ data provided from the donor units 114 and 118 or is derived therefrom (for example, where the master unit 130 converts the received time-domain baseband IQ data into frequency-domain baseband IQ data). The master unit 130 also generates corresponding downlink O-RAN control-plane messages for those O-RAN user-plane messages. The resulting downlink O-RAN user-plane and control-plane messages are communicated (multicasted) to the RUs 106 in the simulcast zone of the corresponding base station 102 via the switched Ethernet network 134.

In the uplink, for each RF-interface base station 116 and CPRI BBU 120, the master unit 130 receives O-RAN uplink user-plane messages for the base station 116 or CPRI BBU 120 and performs a combining or summing process using the uplink baseband IQ data contained in those messages in order to produce combined uplink baseband IQ data, which is provided to the appropriate RF donor unit 114 or CPRI donor unit 118. The RF donor unit 114 or CPRI donor unit 118 uses the combined uplink baseband IQ data to generate a set of base station signals or CPRI data that is communicated to the corresponding RF-interface base station 116 or CPRI BBU 120. If time-domain baseband IQ data has been converted into frequency-domain baseband IQ data for transport over the DAS 100, the donor unit 114 or 118 also converts the combined uplink frequency-domain IQ data into combined uplink time-domain IQ data as part of generating the set of base station signals or CPRI data that is communicated to the corresponding RF-interface base station 116 or CPRI BBU 120.

In the exemplary embodiment shown in FIG. 1, the master unit 130 (more specifically, the O-RAN donor unit 122) receives downlink O-RAN user-plane and control-plane messages from each served O-RAN DU 124 and communicates (multicasts) them to the RUs 106 in the simulcast zone of the corresponding O-RAN DU 124 via the switched Ethernet network 134. In the uplink, the master unit 130 (more specifically, the O-RAN donor unit 122) receives O-RAN uplink user-plane messages for each served O-RAN DU 124 and performs a combining or summing process using the uplink baseband IQ data contained in those messages in order to produce combined uplink IQ data. The O-RAN donor unit 122 produces O-RAN uplink user-plane messages containing the combined uplink baseband IQ data and communicates those messages to the O-RAN DU 124.

In the exemplary embodiment shown in FIG. 1, only uplink transport data is communicated using the ICNs 112, and downlink transport data is communicated from the master unit 130 to the RUs 106 without being forwarded by, or otherwise communicated using, the ICNs 112.

Figure 2:
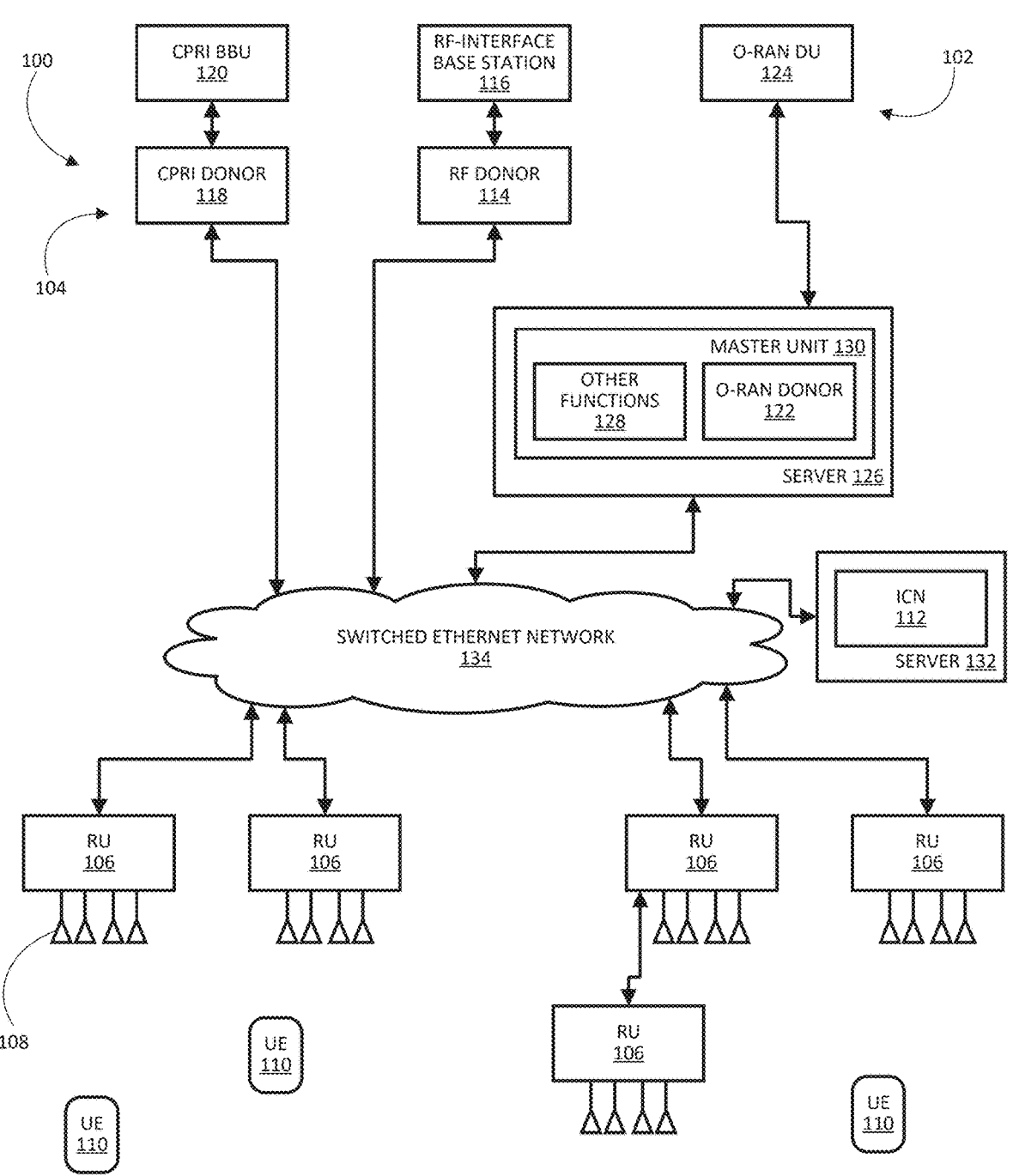

FIG. 2 illustrates another exemplary embodiment of a DAS 100. The DAS 100 shown in FIG. 2 is the same as the DAS 100 shown in FIG. 1 except as described below. In the exemplary embodiment shown in FIG. 2, the RF donor units 114 and CPRI donor units 118 are coupled directly to the switched Ethernet network 134 and not via the master unit 130, as is the case in the embodiment shown in FIG. 1.

As described above, in the exemplary embodiment shown in FIG. 1, the master unit 130 performs some transport functions related to serving the RF-interface base stations 116 and CPRI BBUs 120 coupled to the donor units 114 and 118. In the exemplary embodiment shown in FIG. 2, the RF donor units 114 and CPRI donor units 118 perform those transport functions (that is, the RF donor units 114 and CPRI donor units 118 perform all of the transport functions related to serving the RF-interface base stations 116 and CPRI BBUs 120, respectively).

Figure 3:
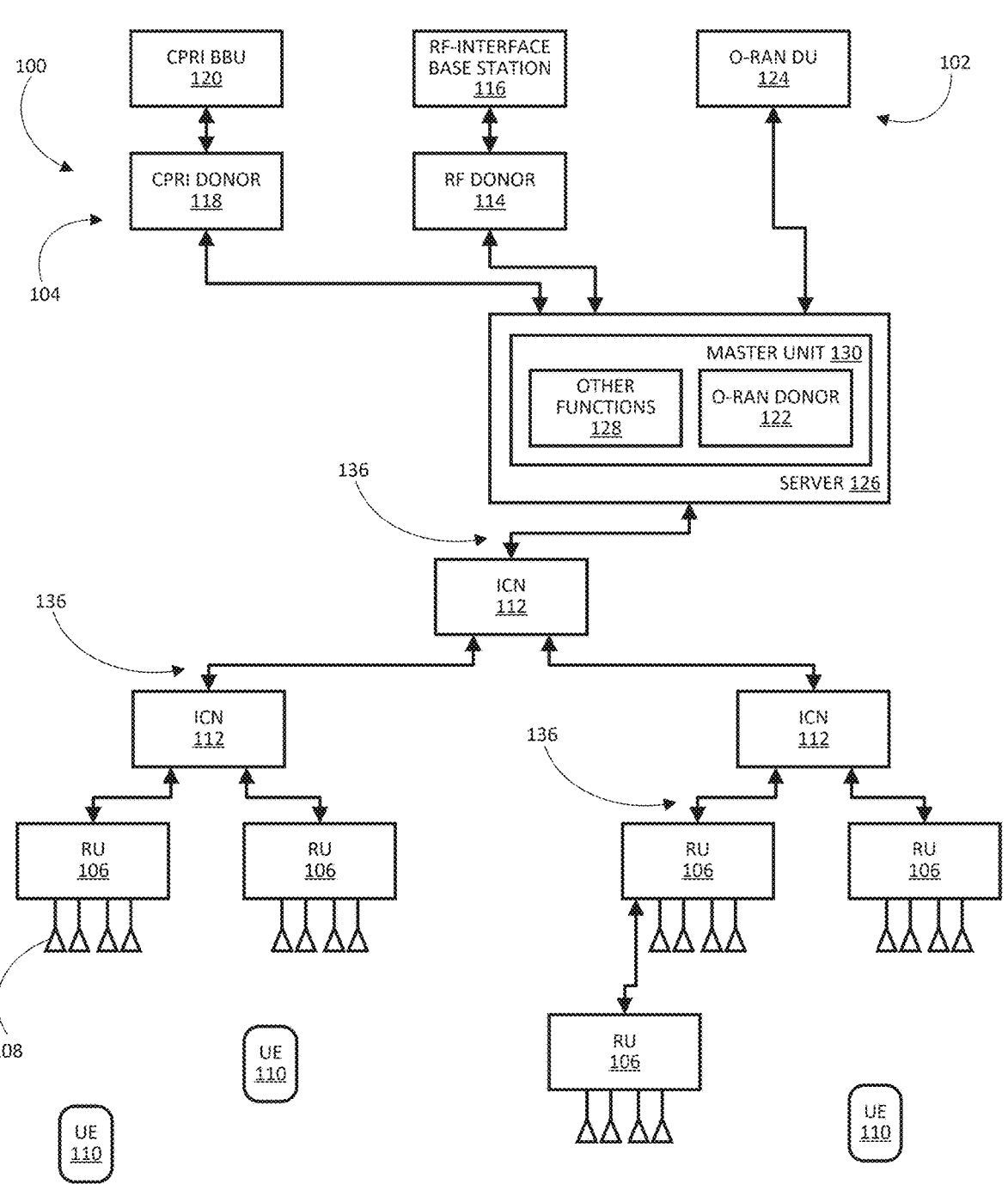

FIG. 3 illustrates another exemplary embodiment of a DAS 100. The DAS 100 shown in FIG. 3 is the same as the DAS 100 shown in FIG. 1 except as described below. In the exemplary embodiment shown in FIG. 3, the donor units 104, RUs 106 and ICNs 112 are communicatively coupled to one another via point-to-point Ethernet links 136 (instead of a switched Ethernet network). Also, in the exemplary embodiment shown in FIG. 3, an O-RAN DU 124 can be coupled to a corresponding O-RAN donor unit 122 via a switched Ethernet network (not shown in FIG. 3), though that switched Ethernet network is not used for communication within the DAS 100. In the exemplary embodiment shown in FIG. 3, the downlink and uplink transport data communicated between the units of the DAS 100 is communicated in Ethernet packets over the point-to-point Ethernet links 136.

For each southbound point-to-point Ethernet link 136 that couples a master unit 130 to an ICN 112, the master unit 130 assembles downlink transport frames and communicates them in downlink Ethernet packets to the ICN 112 over the point-to-point Ethernet link 136. For each point-to-point Ethernet link 136, each downlink transport frame multiplexes together downlink time-domain baseband IQ data and Ethernet data that needs to be communicated to southbound RUs 106 and ICNs 112 that are coupled to the master unit 130 via that point-to-point Ethernet link 136. The downlink time-domain baseband IQ data is sourced from one or more RF donor units 114 and/or CPRI donor units 118. The Ethernet data comprises downlink user-plane and control-plane O-RAN fronthaul data sourced from one or more O-RAN donor units 122 and/or management-plane data sourced from one or more management entities for the DAS 100. That is, this Ethernet data is encapsulated into downlink transport frames that are also used to communicate downlink time-domain baseband IQ data and this Ethernet data is also referred to here as "encapsulated" Ethernet data. The resulting downlink transport frames are communicated in the payload of downlink Ethernet packets communicated from the master unit 130 to the ICN 112 over the point-to-point Ethernet link 136. The Ethernet packets into which the encapsulated Ethernet data is encapsulated are also referred to here as "transport" Ethernet packets.

Each ICN 112 receives downlink transport Ethernet packets via each northbound point-to-point Ethernet link 136 and extracts any downlink time-domain baseband IQ data and/or encapsulated Ethernet data included in the downlink transport frames communicated via the received downlink transport Ethernet packets. Any encapsulated Ethernet data that is intended for the ICN 112 (for example, management-plane Ethernet data) is processed by the ICN 112.

For each southbound point-to-point Ethernet link 136 coupled to the ICN 112, the ICN 112 assembles downlink transport frames and communicates them in downlink Ethernet packets to the southbound entities subtended from the ICN 112 via the point-to-point Ethernet link 136. For each southbound point-to-point Ethernet link 136, each downlink transport frame multiplexes together downlink time-domain baseband IQ data and Ethernet data received at the ICN 112 that needs to be communicated to those subtended southbound entities. The resulting downlink transport frames are communicated in the payload of downlink transport Ethernet packets communicated from the ICN 112 to those subtended southbound entities ICN 112 over the point-to-point Ethernet link 136.

Each RU 106 receives downlink transport Ethernet packets via each northbound point-to-point Ethernet link 136 and extracts any downlink time-domain baseband IQ data and/or encapsulated Ethernet data included in the downlink transport frames communicated via the received downlink transport Ethernet packets. As described above, the RU 106 uses any downlink time-domain baseband IQ data and/or downlink O-RAN user-plane and control-plane fronthaul messages to generate downlink RF signals for radiation from the set of coverage antennas 108 associated with that RU 106. The RU 106 processes any management-plane messages communicated to that RU 106 via encapsulated Ethernet data.

Also, for any southbound point-to-point Ethernet link 136 coupled to the RU 106, the RU 106 assembles downlink transport frames and communicates them in downlink Ethernet packets to the southbound entities subtended from the RU 106 via the point-to-point Ethernet link 136. For each southbound point-to-point Ethernet link 136, each downlink transport frame multiplexes together downlink time-domain baseband IQ data and Ethernet data received at the RU 106 that needs to be communicated to those subtended southbound entities. The resulting downlink transport frames are communicated in the payload of downlink transport Ethernet packets communicated from the RU 106 to those subtended southbound entities ICN 112 over the point-to-point Ethernet link 136.

In the uplink, each RU 106 generates uplink time-domain baseband IQ data and/or uplink O-RAN user-plane fronthaul messages for each RF-interface base station 116, CPRI BBU 120, and/or O-RAN DU 124 served by that RU 106 as described above. For each northbound point-to-point Ethernet link 136 of the RU 106, the RU 106 assembles uplink transport frames and communicates them in uplink transport Ethernet packets northbound towards the appropriate master unit 130 via that point-to-point Ethernet link 136. For each northbound point-to-point Ethernet link 136, each uplink transport frame multiplexes together uplink time-domain baseband IQ data originating from that RU 106 and/or any southbound entity subtended from that RU 106 as well as any Ethernet data originating from that RU 106 and/or any southbound entity subtended from that RU 106. In connection with doing this, the RU 106 performs the combining or summing process described above for any base station 102 served by that RU 106 and also by one or more of the subtended entities. (The RU 106 forwards northbound all other uplink data received from those southbound entities.) The resulting uplink transport frames are communicated in the payload of uplink transport Ethernet packets northbound towards the master unit 130 via the associated point-to-point Ethernet link 136.

Each ICN 112 receives uplink transport Ethernet packets via each southbound point-to-point Ethernet link 136 and extracts any uplink time-domain baseband IQ data and/or encapsulated Ethernet data included in the uplink transport frames communicated via the received uplink transport Ethernet packets. For each northbound point-to-point Ethernet link 136 coupled to the ICN 112, the ICN 112 assembles uplink transport frames and communicates them in uplink transport Ethernet packets northbound towards the master unit 130 via that point-to-point Ethernet link 136. For each northbound point-to-point Ethernet link 136, each uplink transport frame multiplexes together uplink time-domain baseband IQ data and Ethernet data received at the ICN 112 that needs to be communicated northbound towards the master unit 130. The resulting uplink transport frames are communicated in the payload of uplink transport Ethernet packets communicated northbound towards the master unit 130 over the point-to-point Ethernet link 136.

Each master unit 130 receives uplink transport Ethernet packets via each southbound point-to-point Ethernet link 136 and extracts any uplink time-domain baseband IQ data and/or encapsulated Ethernet data included in the uplink transport frames communicated via the received uplink transport Ethernet packets. Any extracted uplink time-domain baseband IQ data, as well as any uplink O-RAN messages communicated in encapsulated Ethernet, is used in producing a single "combined" set of uplink base station signals or data for the associated base station 102 as described above (which includes performing the combining or summing process). Any other encapsulated Ethernet data (for example, management-plane Ethernet data) is forwarded on towards the respective destination (for example, a management entity).

In the exemplary embodiment shown in FIG. 3, synchronization-plane messages are communicated using native Ethernet packets (that is, non-encapsulated Ethernet packets) that are interleaved between the transport Ethernet packets.

Figure 4:
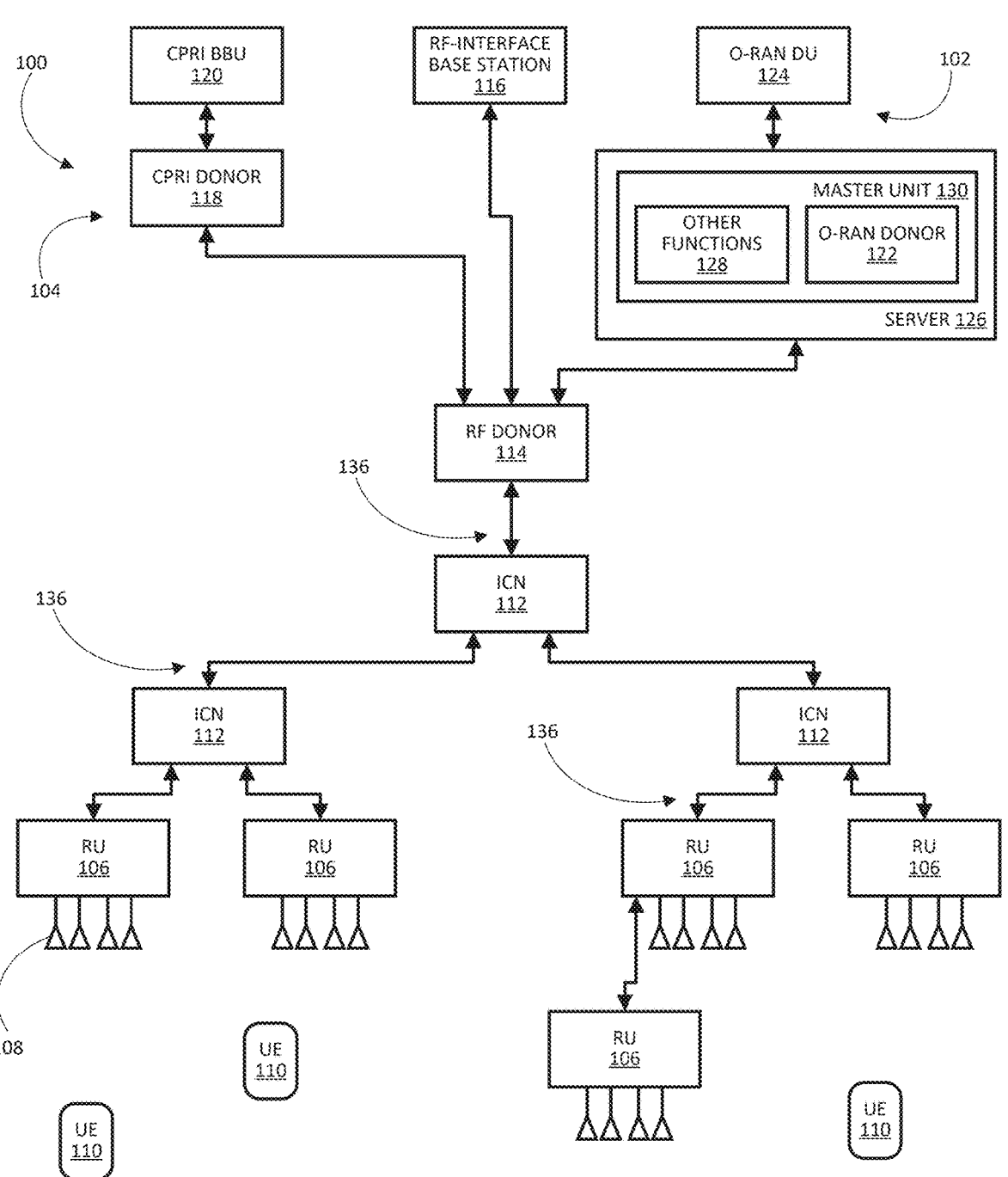

FIG. 4 illustrates another exemplary embodiment of a DAS 100. The DAS 100 shown in FIG. 4 is the same as the DAS 100 shown in FIG. 3 except as described below. In the exemplary embodiment shown in FIG. 4, the CPRI donor units 118, O-RAN donor unit 122, and master unit 130 are coupled to the RUs 106 and ICNs 112 via one or more RF units 114. That is, each RF unit 114 performs the transport frame multiplexing and demultiplexing that is described above in connection with FIG. 3 as being performed by the master unit 130.

Figure 5:
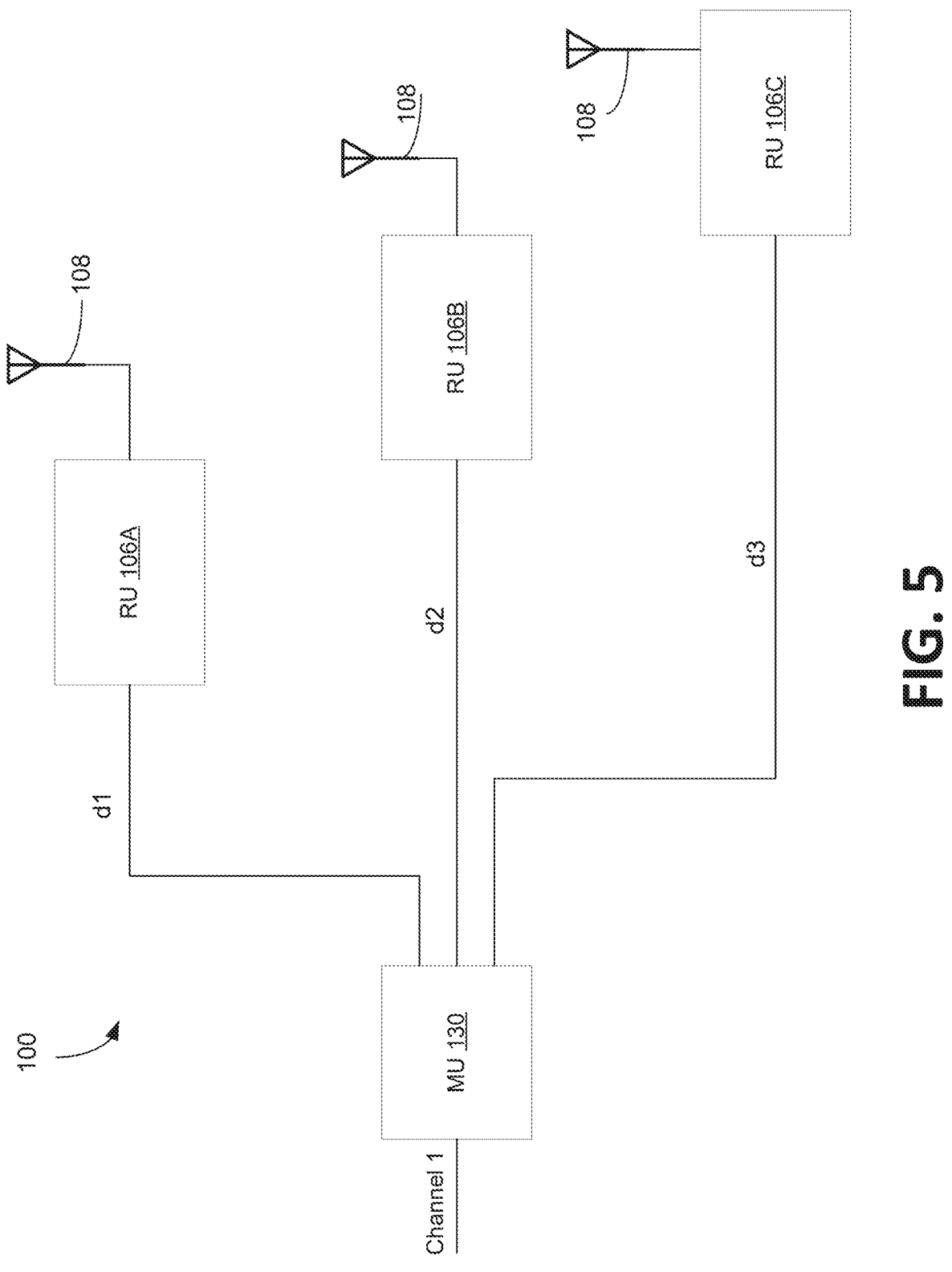
FIG. 5 depicts a block diagram of a distributed antenna system including remote units with different signal path delays, as described in one or more embodiments.

FIG. 5 depicts a block diagram of a distributed antenna system including remote units with different signal path delays. The DAS 100 depicted in FIG. 5 can be implemented using any of the distributed antenna systems described in FIGS. 1-4. For pedagogical explanation, some nodes in FIG. 5 are not explicitly shown, for example, ICNs that may communicatively couple the RUs 106 to the master unit (MU) 130, understanding that such nodes may be utilized in the DAS 100.

In the DAS 100, each RU 106 has a corresponding delay associated with the time a signal is propagated from the MU 130 to the respective RU 106. As shown in FIG. 5, RU 106A has a signal path delay d1, RU 106B has a signal path delay d2, and RU 106C has a signal path delay d3. For pedagogical explanation, d1 is assumed as the shortest delay while d3 is assumed as the longest delay. For a channel 1 received by the MU 130 to be transmitted to any of these RUs 106, the signal path delay corresponding to the RU would need to be taken into account, and may differ between which RU(s) receives channel 1. Also, for any uplink signals received at the antenna 108 from user equipment, there is a signal path delay in transmitting the signals from the respective RU 106 to the MU 130. The signal path delays in the downlink and uplink directions are assumed to be equal, but generally are allowed to differ depending on the implementation of the DAS 100.

In some embodiments, the base station entity (not shown in FIG. 5) that transmits channel 1 to the MU 130 imposes a target delay on the DAS 100. The target delay corresponds to a target time period in which downlink RF signals associated with channel 1 are radiated from the RUs 106 to user equipment. For example, the target delay can be a threshold time of the maximum allowable delay in transmitting channel 1, or can be a minimum delay time that must pass before the designated RUs 106 radiate RF signals associated with channel 1. Generally, when transport signals corresponding to channel 1 are transmitted to multiple RUs 106, it is desirable to have each of the designated RUs 106 transmit downlink RF signals corresponding to channel 1 to the user equipment at the same time. Accordingly, the target delay can be set to the longest delay of the RUs 106A, 106B, 106C.

The DAS 100 is tasked with accommodating the different signal path delays when transmitting channels received from at least one base station entity to the RUs 106. Since some RUs 106 have different signal path delays, the MU 130 can determine an appropriate amount of "equalizing delay" to satisfy each delay target associated with channel 1, which in some examples is done in order to have downlink RF signals associated with channel 1 transmitted by each of the RUs 106A, 106B, 106C to user equipment at the same time. For example, MU 130 can determine that the equalizing delay to RU 106A is DelayA=Dtarget−d1. The equalizing delays can be calculated for the other two RUs to be DelayB=Dtarget− d2 and DelayC=Dtarget−d3. The MU 130 can then delay transmitting channel 1 to the designated RUs 106A, 106B, 106C in accordance with the amount of equalizing delay (if any) for each respective RU. Alternatively, the equalizing delay could be implemented by each of the RUs 106, or implemented by a combination of delay mechanisms from both the MU 130 and the RUs 106.

Although not explicitly shown in FIG. 5, an RU 106 can and typically does receive multiple distinct channels. When an RU 106 (e.g., RU 106A) receives a plurality of channels, each channel can be associated with its own target delay independent of another channel received by the RU 106 (but can also be associated with the same target delay). Therefore, the amount of equalizing delay applied to each RU 106 can differ based on the channel, i.e., the amount of equalizing delay can be determined and applied on a channel-by-channel basis. As used herein, the equalizing delay(s) associated with a given RU also includes any equalizing delays that are determined for different channels received by the given RU.

Figure 6:
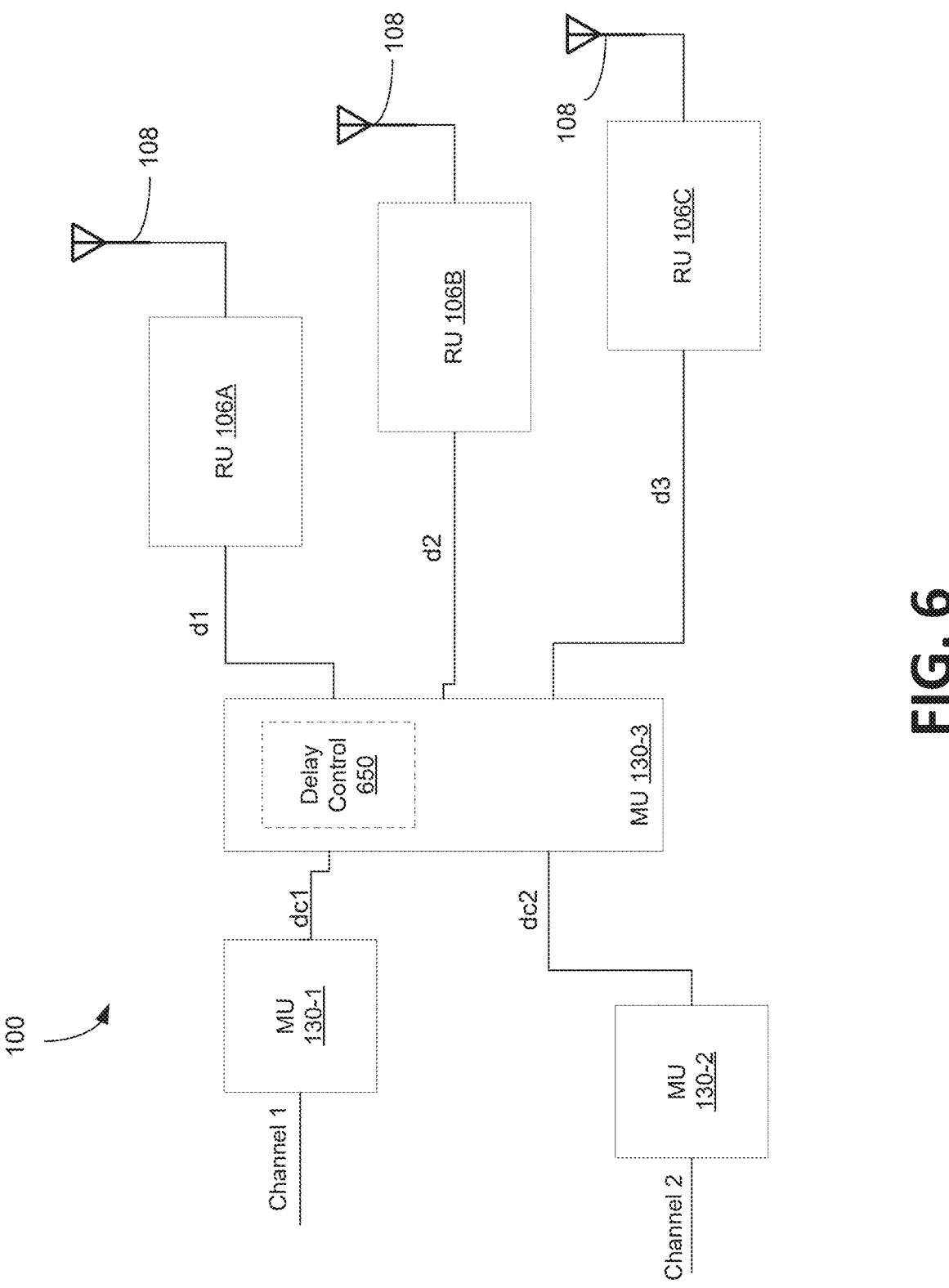
FIG. 6 depicts a block diagram of a distributed antenna system including multiple master unit entities, as described in one or more embodiments.

FIG. 6 depicts a block diagram of a distributed antenna system including multiple master unit entities. In FIG. 6, the functions of the MU 130 are split between MU 130-1, MU 130-2, and MU 130-3, which is coupled to both MU 130-1 and MU 130-2. MU 130-1 is configured to receive channel 1 from a first base station entity, and MU 130-2 is configured to receive channel 2 from a second base station entity. Although channel 1 and channel 2 are described as originating from different base stations, in general both MU 130-1 and MU 130-2 can be coupled to the same base station entity. Additionally, both MU 130-1 and MU 130-2 can receive additional channels from multiple base station entities.

Because the MU 130-1 and MU 130-2 are remote from MU 130-3, both MU 130-1 and MU 130-2 have an additional signal path delay for transmitting their respective channels to MU 130-3. In the example of FIG. 6, there is an additional signal path delay of dc1 for transmitting transport signals associated with channel 1 to MU 130-3, and an additional signal path delay of dc2 for transmitting transport signals associated with channel 2 to MU 130-2. MU 130-3 can transmit transport signals associated with both channels 1 and channel 2 to one or more of the RUs 106A, 106B, 106C. Therefore, the amount of equalized delay determined for each RU may depend on the channel that corresponds to the transport signals received at the RU, and in particular whether the channel was received by MU 130-1 or MU 130-2. For example, the equalized delay for each of the RUs when transmitting RF signals associated with channel 1 is DelayCA1=Dtarget−(d1+dc1) for RU 106A, DelayCB1=Dtarget−(d2+dc1) for RU 106B, and DelayCC1=Dtarget−(d3+dc1) for RU 106C. Similarly, for channel 2 the equalized delay is DelayCA2=Dtarget−(d1+dc2) for RU 106A, DelayCB2=Dtarget−(d2+dc2) for RU 106B, and DelayCC2=Dtarget−(d3+dc2) for RU 106C. As in FIG. 5, the MU 130-3, RUs 106A-106C, or a combination of those entities can implement the equalized delay so that RF signals associated with channel 1 are transmitted at equal times from RUs 106A-106C, and RF signals associated with channel 2 are transmitted at equal times from RUs 106A-106C. Alternatively, the equalized delay can be implemented in part or in whole by MU 130-1 and MU 130-2, where MU 130-1 is configured to implement at least a portion of the equalized delay from channel 1 and MU 130-2 is configured to implement at least a portion of the equalized delay from channel 2.

In some implementations, when MU 130-1 and MU 130-2 are coupled to distinct base station entities, the base station entities have distinct delay targets for their respective channels. For example, a base station entity transmitting channel 1 to MU 130-1 may have a first delay target and another base station entity transmitting channel 2 to MU 130-2 may have a second delay target. The DAS 100 is configured to accommodate the target delays from each base station entity when distributing transport signals corresponding to the channel(s) received by the base station entity. For example, the equalized delay added for channel 1, which corresponds to a first base station entity with a delay target Dtarget1, is DelayCA1=Dtarget1−(d1+dc1) for RU 106A, DelayCB1=Dtarget1−(d2+dc1) for RU 106B, and DelayCC1=Dtarget1−(d3+dc1) for RU 106C. Similarly, for channel 2 the equalized delay for a second base station entity with a delay target Dtarget2 is DelayCA2=Dtarget2−(d1+dc2) for RU 106A, DelayCB2=Dtarget2−(d2+dc2) for RU 106B, and DelayCC2=Dtarget2−(d3+dc2) for RU 106C. Other target delays from more base station entities can be used, as well as from a single base station entity imposing distinct delay targets for different channels.

In some implementations, the MU 130 can selectively equalize delay to particular channels to satisfy each delay target imposed by one or more base station entities. Referring to FIG. 6, MU 130-3 optionally includes a delay control function 650. In some implementations, the delay control function 650 increases the delay associated with one or more channels by a delay variable K. The delay variable K can be a fixed amount of delay added to one or more channels. For example, if the delay control function 650 imposes a delay K to channel 2 but no additional delay to channel 1, then the amount of equalized delay for channel 2 is given by DelayCA2=Dtarget2−(d1+dc2+K) for RU 106A, DelayCB2=Dtarget2−(d2+dc2+K) for RU 106B, and DelayCC2=Dtarget2−(d3+dc2+K) for RU 106C, while the equalized delay for channel 1 would be as previously defined. In these implementations, the amount of equalized delay that would be applied at the RU for a given channel is effectively reduced by the delay variable K. The amount of delay K can be determined by the MU 130-3 and adjusted based on the target delays imposed on the DAS 100 by the base station entities communicatively coupled to the DAS.

For example, the delay control 650 can apply an amount of delay K to one or more of the channels to compensate for delay adjustment limitations of the RUs 106. If the RU 106 can only accommodate a delay of up to 50 microseconds, and the delay target for one or more channels requires at least a delay of 100 microseconds, then the delay control 650 can delay the signal transmission of the downlink RF signals to the RU 106 by an amount of 50 microseconds (or more) so that any remaining delay can be implemented by the RU 106 within its capacity. While in some implementations the MU 130 and/or each RU 106 implement a respective delay to simultaneously transmit a given channel simultaneously from each RU 106, in some implementations a fixed delay is applied to each of the RUs 106 sufficient to satisfy each delay target (regardless of whether the downlink RF signals are transmitted from each RU 106 simultaneously). In these implementations, the fixed delay is "equalized" in the sense that a fixed delay is applied equally to all channels received by the MU 130.

In some implementations, one or more of the delay targets from the base station entities are representative of a minimum delay needed to transmit a signal through the DAS 100. For example, referring to FIG. 6, a first base station entity may have a minimum delay x associated with channel

1, while a second base station entity may have a minimum delay y associated with channel 2. Accordingly, the delay target for the first base station entity is satisfied when a signal from channel 1 takes a delay x or longer to propagate in the DAS 100, while the delay target for the second base station entity is satisfied when a signal from channel 2 takes a delay y or longer to propagate in the DAS 100. In one example, the delay control 650 configures the MU 130-3 to implement a constant delay variable K that satisfies the delay targets for each of the base station entities. If x>y, then the delay variable K can be a fixed value that is greater than x so as to satisfy the minimum delays of both base station entities. In a simple implementation, such a fixed value can be applied to both channels.

The delay variable K can be determined in other ways. For example, the delay in the DAS 100 for channel 1 to a given RU 106 may satisfy the minimum delay for the first base station entity, but the delay for channel 2 to a given RU 106 may be less than the minimum delay required by the second base station entity (that is, the actual delay for channel 2 is less than y). In such a situation, the delay variable can be determined based on the relationship K≥y−D2, where D2 is the minimum delay of channel 2 from the base station entity to the RUs 106. In determining the delay D2, the RU(s) associated with the shortest amount of delay can be used, but other RUs can be selected as well. In this example, MU 130-3 applies the delay to channel 2 so that the total delay satisfies the minimum delay required by the base station entity. These examples serve to illustrate how the delay variable can be utilized; the amount and application of the delay variable will depend on the particular implementation.

Figure 7:
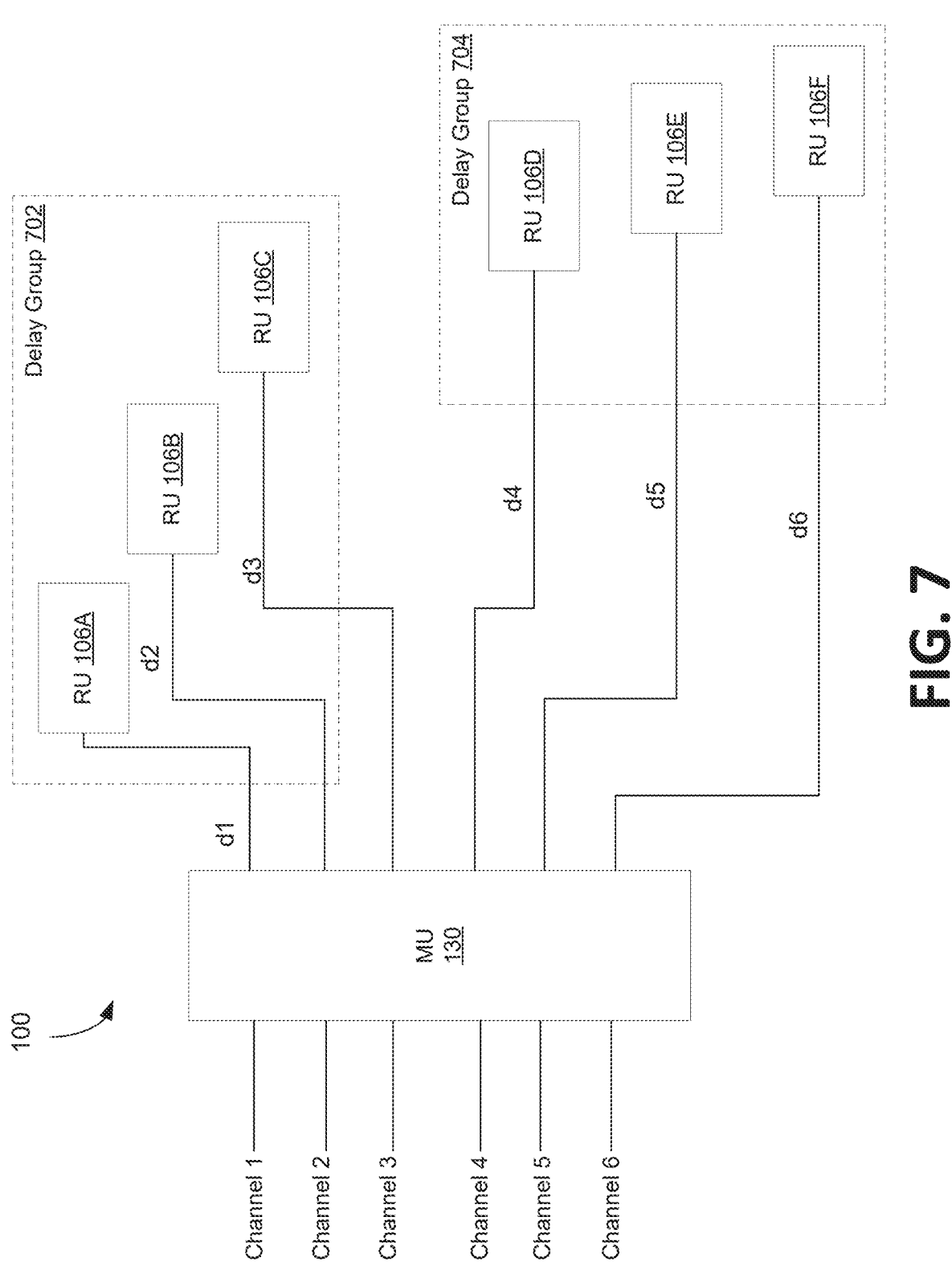
FIG. 7 depicts a block diagram of a distributed antenna system including multiple delay groups of remote units, as described in one or more embodiments.

FIG. 7 depicts a block diagram of a distributed antenna system including multiple delay groups of remote units. As shown in FIG. 7, the RUs 106 of the DAS 100 can be associated with one of multiple delay groups. Two delay groups 702, 704 are shown in FIG. 7, but any number of delay groups can be utilized in the DAS 100. Additionally, each delay group comprises three RUs, with delay group 702 comprising RU 106A, RU 106B, and RU 106C, and delay group 704 comprising RU 106D, RU 106E, and RU 106F. However, a delay group may comprise more or fewer remote units, and one delay group may have a different number of remote units than another delay group. Additionally, a delay group can be defined on a channel-by-channel basis, so that delay group 702, for example, can be associated with channel 4 while delay group 704 can be associated with channel 2. Thus, although not explicitly shown in FIG. 7, an RU 106 (e.g., RU 106A) can be associated with multiple delay groups when multiple channels associated with different delay groups are received by the same RU 106.

In the exemplary DAS 100 shown in FIG. 7, each of the RUs 106 are configured to receive and process signals from Channels 1-6. Similar to FIGS. 5-6, each RU has an associated delay d1-d6 from the MU 130 to the respective RU. While each channel can be provided from a distinct base station entity, in some implementations, one or more of the channels are provided by the same base station entity. In general, the number of channels received by the MU 130 can differ from the number of RUs in the DAS 100.

Each delay group 702, 704 is associated with a target delay. For pedagogical explanation, the target delay for delay group 702 is DG1Target and the target delay for delay group 704 is DG2Target. The target delay can be set based on the delay associated with a particular RU in the delay group, for example, the RU associated with the longest amount of delay. In FIG. 7, target delay for delay group 702 would be the delay associated with RU 106C, and for delay group 704 the target delay would be the delay associated with RU 106F. However, the target delay for a delay group can be determined in other ways (e.g., on a channel-by-channel basis).

The amount of equalizing delay applied to each RU can be determined as previously described in the context of FIGS. 5-6, with the target delay of a particular RU set to the target delay of the delay group that the RU forms part of. For example, in FIG. 7, the equalizing delay applied to each of the RUs 106A-106F is determined as follows: Delay=DG1Target−d1 for RU 106A, Delay=DG1Target−d2 for RU 106B, Delay=DG1Target−d3 for RU 106C, Delay=DG2Target−d4 for RU 106D, Delay=DG2Target−d5 for RU 106E, and Delay=DG2Target-d6 for RU 106F. Thus, different amounts of equalized delay can be applied to different RUs in a delay group, e.g., for the purpose of ensuring RF signals corresponding to each channel are transmitted from the RUs in a delay group at the same time.

As previously noted, a delay group may have a target delay dependent on the type of channel and/or base station entity, so that the target delay and hence the amount of equalized delay can differ between channels. For example, the equalized delay applied to delay group 702 may differ for channel 1 than for channel 2. Also, the implementation of a delay variable K and the minimum target delays imposed by one or more base station entities are additional parameters that can be used to determine the equalized delay for each delay group 702, 704.

Figure 8:
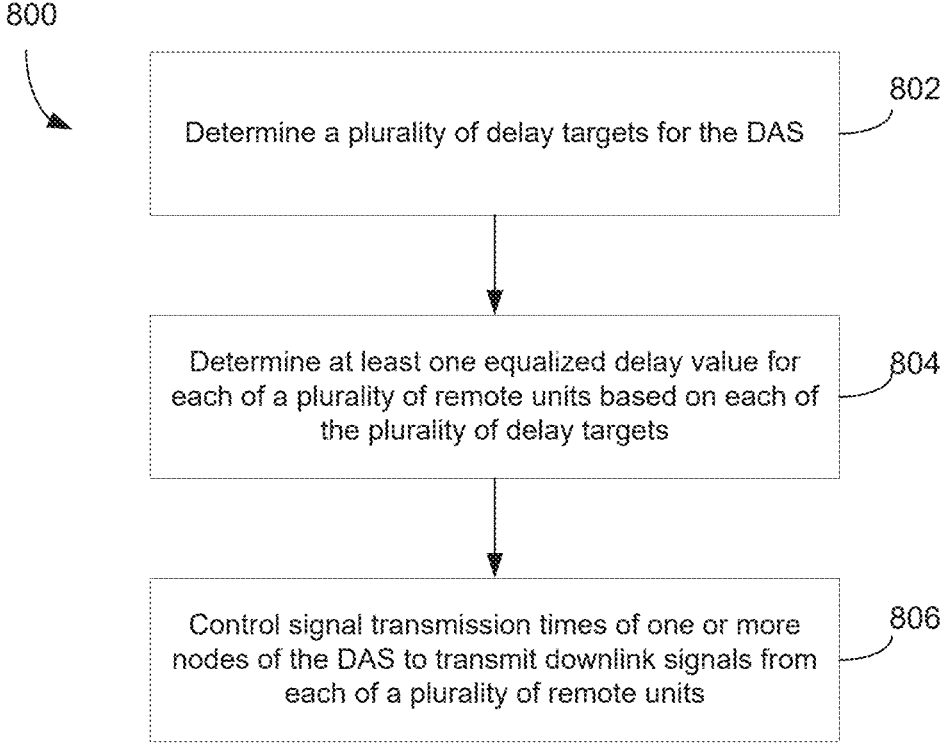
FIG. 8 depicts a flow diagram of a method for transmitting downlink radio frequency (RF) signals in a distributed antenna system, as described in one or more embodiments.

FIG. 8 depicts a flow diagram of a method 800 for transmitting downlink radio frequency (RF) signals in a distributed antenna system. Method 800 may be implemented via the techniques described with respect to FIGS. 1-7, but may be implemented via other techniques as well. The blocks of the flow diagram have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner). Also, most standard exception handling is not described for case of explanation; however, it is to be understood that method 800 can and typically would include such exception handling.

Method 800 includes determining a plurality of delay targets for the distributed antenna system at block 802. In some implementations, each delay target is imposed on the DAS by at least one base station entity. Each base station entity coupled to the DAS, such as to the master unit 130, can have a delay target. Also, the delay target may be associated with a particular channel provided to the master unit 130, independent of the base station entity. In some implementations, at least one of the delay targets includes a minimum or maximum delay target threshold. In the case of a minimum delay target threshold, the total signal transmission delay from receiving the downlink signals from the base station entity to when the corresponding downlink RF signals are transmitted from the intended remote unit(s) should be at or greater than the delay target threshold. In the case of a maximum delay target threshold, the total signal transmission delay from receiving the downlink signals from the base station entity to when the corresponding downlink RF signals are transmitted from the intended remote unit(s) should be at or less than the delay target threshold.

Method 800 proceeds to block 804 and determines at least one equalized delay value based on each of the delay targets. The at least one equalized delay value is determined for each of the plurality of remote units of the DAS. In one implementation, the equalized delay value can be a plurality of equalized delay values (which may be zero) each respective to a remote unit of the DAS. For example, if the signal transmission time for a first remote unit is shorter than a second remote unit (e.g., because the first remote unit is located closer to the master unit and the second remote unit is further remote from the master unit), then the equalized delay value for the first remote unit is larger than the equalized delay value for the second remote unit. If the first and second remote units are positioned approximately the same distance from the master unit, then the equalized delay value determined for both remote units can be equal.

In some implementations, the equalized delay value for each of the remote units is determined based on the channel or base station entity. That is, for multiple channels received from at least one base station entity, the equalized delay value determined for each of the plurality of remote units may differ for a first channel than for a second channel. Similarly, for multiple base station entities coupled to the master unit, the equalized delay value determined for each of the plurality of remote units may differ for one base station entity than for another base station entity. In some implementations, a portion of the remote units receive a channel while others may not. In these implementations, the equalized delay would only be applied to the portion of the remote units receiving the channel.

In some implementations, the equalized delay value is a fixed delay that satisfies each of the delay targets (minimum or maximum delays) of the base station entities coupled to the master unit. For example, the DAS is configured to determine the signal transmission delay associated with a signal path between each remote unit and the master unit. When the signal transmission delay of the signal path between the base station entity and the master unit is known, the equalized delay value can be determined based on the signal transmission delay between the base station entity and the master unit, the transmission delay between the master unit and the remote unit, and the delay target. In one example, the equalized delay is given by the equation Delay=Dtarget−d1, where Dtarget is the delay target and d1 is the DAS delay between the master unit and the respective remote unit.

Proceeding to block 806, method 800 controls signal transmission times of one or more nodes of the DAS based on the equalized delay value(s). In some implementations, method 800 controls signals transmission times of one or more nodes of the DAS so that the downlink RF signals are transmitted from each of the plurality of remote units with a total delay that satisfies each of the plurality of delay targets. In some implementations, the signal transmission times are controlled so that each remote unit of a plurality of remote units of the DAS transmit downlink RF signals simultaneously to user equipment. Depending on the location of the remote unit relative to the master unit, the remote unit experiences a delay equal to the equalized delay value before the remote unit radiates the downlink RF signals. Remote units located closer to the master unit relative to other remote units typically will have longer equalized delay values to accommodate the longer signal transmission times for farther remote units.

In some implementations, the remote units are classified into delay groups as shown in FIG. 7, for example. Each delay group is associated with a delay target. In these implementations, the DAS is configured to control signal transmission times so that each remote unit of a delay group transmits downlink RF signals simultaneously.

In general, the signal transmission times of nodes of the DAS can be controlled by the master unit, the remote units, and/or by a system controller (including the management entities previously described) communicatively coupled to the master unit and the remote units. For example, the master unit can implement at least some of the delay functionality of the DAS by delaying the transmission of the signals received from the base station entity to the intended remote units. In implementations where the master unit is coupled to the remote unit via a plurality of ports, the master unit is configured to delay transmission of the downlink transport signals to the port that corresponds to the associated channel or base station entity in order to fully or partially realize the amount of total delay for the remote unit. In some implementations, the remote units are configured to delay the transmission of the downlink RF signals in order to fully or partially realize the amount of total delay. In some implementations, the delay is controlled by a combination of both the master unit and the remote units. Although not explicitly shown in FIGS. 5-7, the signal transmission times can also be controlled by intervening nodes between the master unit and the remote units, such as the ICNs 112 depicted in FIGS. 1-4. When implemented, the ICNs 112 can be configured to implement at least some of the delay functionality of the DAS, alone or in combination with the master unit and remote units.

While FIGS. 5-8 describe equalizing delay in the downlink direction, similar techniques can also be applied in the uplink direction, in which uplink signals are transmitted simultaneously between each of a plurality of remote units to the master unit. In these implementations, the amount of equalized delay is determined for each remote unit as previously described for uplink transmission to the master unit. The master unit can also be configured to implement at least some of the delay functionality so that the uplink signals from different remote units are communicated from the master unit to the base station entity simultaneously.

The methods and techniques described herein may be implemented in digital electronic circuitry, or with a programmable processor (for example, a special-purpose processor or a general-purpose processor such as a computer) firmware, software, or in various combinations of each. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instruction to, a data storage system, at least one input device, and at least one output device. Generally, a processor will receive instructions and data from a read-only memory and/or a random-access memory. Storage devices suitable for tangibly embodying computer program instructions and data include all forma of non-volatile memory, including by way of example semiconductor memory devices, such as erasable programmable read-only memory (EPROM), electrically erasable programmable read-only memory (EEPROM), and flash memory devices; magnetic disks such as internal hard disks and removable disks; magneto-optical disks; and the like. Any of the foregoing may be supplemented by, or incorporated in, specially-designed application specific integrated circuits (ASICs).

EXAMPLE EMBODIMENTS

Example 1 includes a distributed antenna system, comprising: at least one master unit, wherein the at least one master unit is configured to receive downlink signals from at least one base station entity, wherein the at least one master unit is configured to generate downlink transport signals based on the downlink signals; and a plurality of remote units communicatively coupled to the at least one master unit, wherein the plurality of remote units is configured to generate downlink radio frequency (RF) signals based on the downlink transport signals, wherein the plurality of remote units is configured to radiate the downlink RF signals to user equipment in at least one coverage zone; wherein the distributed antenna system is configured to: determine a plurality of delay targets for the distributed antenna system, determine at least one equalized delay value for each of the plurality of remote units based on each of the plurality of delay targets, and control signal transmission times of at least one node of the distributed antenna system based on the at least one equalized delay value so that the downlink RF signals are transmitted from each of the plurality of remote units with a total delay that satisfies each of the plurality of delay targets.

Example 2 includes the distributed antenna system of Example 1, wherein the distributed antenna system is configured to control signal transmission times of the at least one node based on the at least one equalized delay value so that the downlink RF signals are transmitted from each of the plurality of remote units simultaneously.

Example 3 includes the distributed antenna system of any of Examples 1-2, wherein the at least one master unit is configured to receive first downlink signals from a first base station entity, and to receive second downlink signals from a second base station entity, wherein the first downlink signals are associated with a first delay target from the first base station entity, and the second downlink signals are associated with a second delay target from the second base station entity, wherein the distributed antenna system is configured to: determine at least one first equalized delay value for each of the plurality of remote units based on the first delay target, and to determine at least one second equalized delay value for each of the plurality of remote units based on the second delay target, and control signal transmission times of the at least one node of the distributed antenna system based on the at least one first and at least one second equalized delay values so that the downlink RF signals associated with the first downlink signals are transmitted from each of the plurality of remote units simultaneously and that downlink RF signals associated with the second downlink signals are transmitted from each of the plurality of remote units simultaneously.

Example 4 includes the distributed antenna system of any of Examples 1-3, wherein the at least one master unit is configured to receive a first channel from the at least one base station entity, and to receive a second channel from the at least one base station entity, wherein the first channel is associated with a first delay target from the at least one base station entity, and the second channel is associated with a second delay target from the at least one base station entity, wherein the distributed antenna system is configured to: determine at least one first equalized delay value for each of the plurality of remote units based on the first delay target, and to determine at least one second equalized delay value for each of the plurality of remote units based on the second delay target, and control signal transmission times of the at least one node of the distributed antenna system based on the at least one first and at least one second equalized delay values so that the downlink RF signals associated with the first channel is transmitted from each of the plurality of remote units simultaneously and that downlink RF signals associated with the second channel is transmitted from each of the plurality of remote units simultaneously.

Example 5 includes the distributed antenna system of any of Examples 1-4, wherein the plurality of remote units comprise a first plurality of remote units of a first delay group and a second plurality of remote units of a second delay group, wherein the distributed antenna system is configured to: determine at least one first equalized delay value for the first delay group, and to determine at least one second equalized delay value for the second delay group, and control signal transmission times of the at least one node of the distributed antenna system based on the at least one first and at least one second equalized delay values so that downlink RF signals associated with the first delay group are transmitted from each of the first plurality of remote units simultaneously and that downlink RF signals associated with the second delay group are transmitted from each of the second plurality of remote units simultaneously.

Example 6 includes the distributed antenna system of any of Examples 1-5, wherein the at least one of the plurality of delay targets includes a minimum delay target threshold, wherein the distributed antenna system is configured to control signal transmission times of the at least one node so that the downlink RF signals transmitted from the plurality of remote units have a delay at or exceeding the minimum delay target threshold.

Example 7 includes the distributed antenna system of any of Examples 1-6, wherein the at least one of the plurality of delay targets includes a maximum delay target threshold, wherein the distributed antenna system is configured to control signal transmission times of the at least one node so that the downlink RF signals transmitted from the plurality of remote units have a delay at or below the maximum delay target threshold.

Example 8 includes the distributed antenna system of any of Examples 1-7, wherein the distributed antenna system is configured to: determine at least one first signal transmission delay associated with at least one signal path between the at least one master unit and the at least one base station entity; determine at least one second signal transmission delay associated with at least one signal path between the at least one master unit and a respective one of the plurality of remote units; determine the at least one equalized delay value based on the at least one delay target, the at least one first signal transmission delay, and the at least one second signal transmission delay.

Example 9 includes a method for transmitting downlink radio frequency (RF) signals in a distributed antenna system, wherein the distributed antenna system comprises at least one master unit communicatively coupled to a plurality of remote units, the method comprising: determining a plurality of delay targets for the distributed antenna system; determining at least one equalized delay value for each of the plurality of remote units based on each of the plurality of delay targets; and control signal transmission times of at least one node of the distributed antenna system based on the at least one equalized delay value so that the downlink RF signals are transmitted from each of the plurality of remote units with a total delay that satisfies each of the plurality of delay targets.

Example 10 includes the method of Example 9, wherein controlling signal transmission times of the at least one node comprises controlling signal transmission times via at least one of: the at least one master unit, the plurality of remote units, and/or a system controller communicatively coupled to the at least one master unit and the plurality of remote units.

Example 11 includes the method of any of Examples 9-10, comprising: receiving first downlink signals from a first base station entity and second downlink signals from a second base station entity, wherein the first downlink signals are associated with a first delay target from the first base station entity, and the second downlink signals are associated with a second delay target from the second base station entity, determining at least one first equalized delay value for each of the plurality of remote units based on the first delay target, and at least one second equalized delay value for each of the plurality of remote units based on the second delay target, and controlling signal transmission times of the at least one node of the distributed antenna system based on the at least one first and at least one second equalized delay values so that the downlink RF signals associated with the first downlink signals are transmitted from each of the plurality of remote units simultaneously and that downlink RF signals associated with the second downlink signals are transmitted from each of the plurality of remote units simultaneously.

Example 12 includes the method of any of Examples 9-11, comprising: receiving a first channel from at least one base station entity, and a second channel from the at least one base station entity, wherein the first channel is associated with a first delay target from the at least one base station entity, and the second channel is associated with a second delay target from the at least one base station entity, determining at least one first equalized delay value for each of the plurality of remote units based on the first delay target, and at least one second equalized delay value for each of the plurality of remote units based on the second delay target, and controlling signal transmission times of the at least one node of the distributed antenna system based on the at least one first and at least one second equalized delay values so that the downlink RF signals associated with the first channel is transmitted from each of the plurality of remote units simultaneously and that downlink RF signals associated with the second channel is transmitted from each of the plurality of remote units simultaneously.

Example 13 includes the method of any of Examples 9-12, wherein the plurality of remote units comprise a first plurality of remote units of a first delay group and a second plurality of remote units of a second delay group, and further comprising: determining at least one first equalized delay value for the first delay group, and at least one second equalized delay value for the second delay group, and controlling signal transmission times of the at least one node of the distributed antenna system based on the at least one first and at least one second equalized delay values so that downlink RF signals associated with the first delay group are transmitted from each of the first plurality of remote units simultaneously and that downlink RF signals associated with the second delay group are transmitted from each of the second plurality of remote units simultaneously.

Example 14 includes the method of any of Examples 9-13, wherein at least one of the plurality of delay targets includes a minimum delay target threshold, and further comprising: controlling signal transmission times of the at least one node so that the downlink RF signals transmitted from the plurality of remote units have a delay at or exceeding the minimum delay target threshold.

Example 15 includes the method of any of Examples 9-14, wherein at least one of the plurality of delay targets includes a maximum delay target threshold, and further comprising: controlling signal transmission times of the at least one node so that the downlink RF signals transmitted from the plurality of remote units have a delay at or below the maximum delay target threshold.

Example 16 includes the method of any of Examples 9-15, comprising: determining at least one first signal transmission delay associated with at least one signal path between the at least one master unit and at least one base station entity; determining at least one second signal transmission delay associated with at least one signal path between the at least one master unit and a respective one of the plurality of remote units; and determining the at least one equalized delay value based on at least one delay target, the at least one first signal transmission delay, and the at least one second signal transmission delay.

Example 17 includes a program product comprising a non-transitory processor-readable medium on which program instructions, configured to be executed by at least one processor, are embodied, wherein by executing the program instructions, the at least one processor is configured to: determine a plurality of delay targets for a distributed antenna system, wherein the distributed antenna system comprises at least one master unit communicatively coupled to a plurality of remote units; determine at least one equalized delay value for each of the plurality of remote units based on each of the plurality of delay targets; and control signal transmission times of at least one node of the distributed antenna system based on the at least one equalized delay value so that downlink RF signals are transmitted from each of the plurality of remote units with a total delay that satisfies each of the plurality of delay targets.

Example 18 includes the program product of Example 17, wherein by executing the program instructions, the at least one processor is configured to: receive first downlink signals from a first base station entity and second downlink signals from a second base station entity, wherein the first downlink signals are associated with a first delay target from the first base station entity, and the second downlink signals are associated with a second delay target from the second base station entity, determine at least one first equalized delay value for each of the plurality of remote units based on the first delay target, and at least one second equalized delay value for each of the plurality of remote units based on the second delay target, and control signal transmission times of the at least one node of the distributed antenna system based on the at least one first and at least one second equalized delay values so that the downlink RF signals associated with the first downlink signals are transmitted from each of the plurality of remote units simultaneously and that downlink RF signals associated with the second downlink signals are transmitted from each of the plurality of remote units simultaneously.

Example 19 includes the program product of any of Examples 17-18, wherein by executing the program instructions, the at least one processor is configured to: receive a first channel from at least one base station entity, and a second channel from the at least one base station entity, wherein the first channel is associated with a first delay target from the at least one base station entity, and the second channel is associated with a second delay target from the at least one base station entity, determine at least one first equalized delay value for each of the plurality of remote units based on the first delay target, and at least one second equalized delay value for each of the plurality of remote units based on the second delay target, and control signal transmission times of the at least one node of the distributed antenna system based on the at least one first and at least one second equalized delay values so that the downlink RF signals associated with the first channel is transmitted from each of the plurality of remote units simultaneously and that downlink RF signals associated with the second channel is transmitted from each of the plurality of remote units simultaneously.

Example 20 includes the program product of any of Examples 17-19, wherein the plurality of remote units comprise a first plurality of remote units of a first delay group and a second plurality of remote units of a second delay group, wherein by executing the program instructions, the at least one processor is configured to: determine at least one first equalized delay value for the first delay group, and at least one second equalized delay value for the second delay group, and control signal transmission times of the at least one node of the distributed antenna system based on the at least one first and at least one second equalized delay values so that downlink RF signals associated with the first delay group are transmitted from each of the first plurality of remote units simultaneously and that downlink RF signals associated with the second delay group are transmitted from each of the second plurality of remote units simultaneously.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:
1. A distributed antenna system, comprising:
at least one master unit, wherein the at least one master unit is configured to receive downlink signals from at least one base station entity, wherein the at least one master unit is configured to generate downlink transport signals based on the downlink signals; and
a plurality of remote units communicatively coupled to the at least one master unit, wherein the plurality of remote units is configured to generate downlink radio frequency (RF) signals based on the downlink transport signals, wherein the plurality of remote units is configured to radiate the downlink RF signals to user equipment in at least one coverage zone;
wherein the distributed antenna system is configured to:
determine a plurality of delay targets for the distributed antenna system, wherein each delay target is imposed by at least one base station entity,
determine at least one equalized delay value for each of the plurality of remote units based on each of the plurality of delay targets, and
control signal transmission times of at least one node of the distributed antenna system based on the at least one equalized delay value so that the downlink RF signals are transmitted from each of the plurality of remote units with a total delay that satisfies each of the plurality of delay targets.
2. The distributed antenna system of claim 1, wherein the distributed antenna system is configured to control signal transmission times of the at least one node based on the at least one equalized delay value so that the downlink RF signals are transmitted from each of the plurality of remote units simultaneously.

3. The distributed antenna system of claim 1,
wherein the at least one master unit is configured to receive first downlink signals from a first base station entity, and to receive second downlink signals from a second base station entity,
wherein the first downlink signals are associated with a first delay target from the first base station entity, and the second downlink signals are associated with a second delay target from the second base station entity,
wherein the distributed antenna system is configured to:
determine at least one first equalized delay value for each of the plurality of remote units based on the first delay target, and to determine at least one second equalized delay value for each of the plurality of remote units based on the second delay target, and
control signal transmission times of the at least one node of the distributed antenna system based on the at least one first and at least one second equalized delay values so that the downlink RF signals associated with the first downlink signals are transmitted from each of the plurality of remote units simultaneously and that downlink RF signals associated with the second downlink signals are transmitted from each of the plurality of remote units simultaneously.

4. The distributed antenna system of claim 1,
wherein the at least one master unit is configured to receive a first channel from the at least one base station entity, and to receive a second channel from the at least one base station entity,
wherein the first channel is associated with a first delay target from the at least one base station entity, and the second channel is associated with a second delay target from the at least one base station entity,
wherein the distributed antenna system is configured to:
determine at least one first equalized delay value for each of the plurality of remote units based on the first delay target, and to determine at least one second equalized delay value for each of the plurality of remote units based on the second delay target, and
control signal transmission times of the at least one node of the distributed antenna system based on the at least one first and at least one second equalized delay values so that the downlink RF signals associated with the first channel is transmitted from each of the plurality of remote units simultaneously and that downlink RF signals associated with the second channel is transmitted from each of the plurality of remote units simultaneously.

5. The distributed antenna system of claim 1, wherein the plurality of remote units comprise a first plurality of remote units of a first delay group and a second plurality of remote units of a second delay group,
wherein the distributed antenna system is configured to:
determine at least one first equalized delay value for the first delay group, and to determine at least one second equalized delay value for the second delay group, and
control signal transmission times of the at least one node of the distributed antenna system based on the at least one first and at least one second equalized delay values so that downlink RF signals associated with the first delay group are transmitted from each of the first plurality of remote units simultaneously and that downlink RF signals associated with the second delay group are transmitted from each of the second plurality of remote units simultaneously.

6. The distributed antenna system of claim 1, wherein the at least one of the plurality of delay targets includes a minimum delay target threshold, wherein the distributed antenna system is configured to control signal transmission times of the at least one node so that the downlink RF signals transmitted from the plurality of remote units have a delay at or exceeding the minimum delay target threshold.

7. The distributed antenna system of claim 1, wherein the at least one of the plurality of delay targets includes a maximum delay target threshold, wherein the distributed antenna system is configured to control signal transmission times of the at least one node so that the downlink RF signals transmitted from the plurality of remote units have a delay at or below the maximum delay target threshold.

8. The distributed antenna system of claim 1, wherein the distributed antenna system is configured to:
determine at least one first signal transmission delay associated with at least one signal path between the at least one master unit and the at least one base station entity;
determine at least one second signal transmission delay associated with at least one signal path between the at least one master unit and a respective one of the plurality of remote units;
determine the at least one equalized delay value based on the at least one delay target, the at least one first signal transmission delay, and the at least one second signal transmission delay.

9. A method for transmitting downlink radio frequency (RF) signals in a distributed antenna system, wherein the distributed antenna system comprises at least one master unit communicatively coupled to a plurality of remote units, the method comprising:
determining a plurality of delay targets for the distributed antenna system, wherein each delay target is imposed by at least one base station entity;
determining at least one equalized delay value for each of the plurality of remote units based on each of the plurality of delay targets; and
controlling signal transmission times of at least one node of the distributed antenna system based on the at least one equalized delay value so that the downlink RF signals are transmitted from each of the plurality of remote units with a total delay that satisfies each of the plurality of delay targets.

10. The method of claim 9, wherein controlling signal transmission times of the at least one node comprises controlling signal transmission times via at least one of: the at least one master unit, the plurality of remote units, and/or a system controller communicatively coupled to the at least one master unit and the plurality of remote units.

11. The method of claim 9, comprising:
receiving first downlink signals from a first base station entity and second downlink signals from a second base station entity, wherein the first downlink signals are associated with a first delay target from the first base station entity, and the second downlink signals are associated with a second delay target from the second base station entity,
determining at least one first equalized delay value for each of the plurality of remote units based on the first delay target, and at least one second equalized delay value for each of the plurality of remote units based on the second delay target, and controlling signal transmission times of the at least one node of the distributed antenna system based on the at least one first and at least one second equalized delay values so that the downlink RF signals associated with the first downlink signals are transmitted from each of the plurality of remote units simultaneously and that downlink RF signals associated with the second downlink signals are transmitted from each of the plurality of remote units simultaneously.

12. The method of claim 9, comprising:

receiving a first channel from at least one base station entity, and a second channel from the at least one base station entity, wherein the first channel is associated with a first delay target from the at least one base station entity, and the second channel is associated with a second delay target from the at least one base station entity, determining at least one first equalized delay value for each of the plurality of remote units based on the first delay target, and at least one second equalized delay value for each of the plurality of remote units based on the second delay target, and controlling signal transmission times of the at least one node of the distributed antenna system based on the at least one first and at least one second equalized delay values so that the downlink RF signals associated with the first channel is transmitted from each of the plurality of remote units simultaneously and that downlink RF signals associated with the second channel is transmitted from each of the plurality of remote units simultaneously.

13. The method of claim 9, wherein the plurality of remote units comprise a first plurality of remote units of a first delay group and a second plurality of remote units of a second delay group, and further comprising:

determining at least one first equalized delay value for the first delay group, and at least one second equalized delay value for the second delay group, and controlling signal transmission times of the at least one node of the distributed antenna system based on the at least one first and at least one second equalized delay values so that downlink RF signals associated with the first delay group are transmitted from each of the first plurality of remote units simultaneously and that downlink RF signals associated with the second delay group are transmitted from each of the second plurality of remote units simultaneously.

14. The method of claim 9, wherein at least one of the plurality of delay targets includes a minimum delay target threshold, and further comprising:

controlling signal transmission times of the at least one node so that the downlink RF signals transmitted from the plurality of remote units have a delay at or exceeding the minimum delay target threshold.

15. The method of claim 9, wherein at least one of the plurality of delay targets includes a maximum delay target threshold, and further comprising:

controlling signal transmission times of the at least one node so that the downlink RF signals transmitted from the plurality of remote units have a delay at or below the maximum delay target threshold.

16. The method of claim 9, comprising:

determining at least one first signal transmission delay associated with at least one signal path between the at least one master unit and at least one base station entity;

determining at least one second signal transmission delay associated with at least one signal path between the at least one master unit and a respective one of the plurality of remote units; and determining the at least one equalized delay value based on at least one delay target, the at least one first signal transmission delay, and the at least one second signal transmission delay.

17. A program product comprising a non-transitory processor-readable medium on which program instructions, configured to be executed by at least one processor, are embodied, wherein by executing the program instructions, the at least one processor is configured to:

determine a plurality of delay targets for a distributed antenna system, wherein each delay target is imposed by at least one base station entity, further wherein the distributed antenna system comprises at least one master unit communicatively coupled to a plurality of remote units;

determine at least one equalized delay value for each of the plurality of remote units based on each of the plurality of delay targets; and control signal transmission times of at least one node of the distributed antenna system based on the at least one equalized delay value so that downlink RF signals are transmitted from each of the plurality of remote units with a total delay that satisfies each of the plurality of delay targets.

18. The program product of claim 17, wherein by executing the program instructions, the at least one processor is configured to:

receive first downlink signals from a first base station entity and second downlink signals from a second base station entity, wherein the first downlink signals are associated with a first delay target from the first base station entity, and the second downlink signals are associated with a second delay target from the second base station entity, determine at least one first equalized delay value for each of the plurality of remote units based on the first delay target, and at least one second equalized delay value for each of the plurality of remote units based on the second delay target, and control signal transmission times of the at least one node of the distributed antenna system based on the at least one first and at least one second equalized delay values so that the downlink RF signals associated with the first downlink signals are transmitted from each of the plurality of remote units simultaneously and that downlink RF signals associated with the second downlink signals are transmitted from each of the plurality of remote units simultaneously.

19. The program product of claim 17, wherein by executing the program instructions, the at least one processor is configured to:

receive a first channel from at least one base station entity, and a second channel from the at least one base station entity, wherein the first channel is associated with a first delay target from the at least one base station entity, and the second channel is associated with a second delay target from the at least one base station entity, determine at least one first equalized delay value for each of the plurality of remote units based on the first delay target, and at least one second equalized delay value for each of the plurality of remote units based on the second delay target, and control signal transmission times of the at least one node of the distributed antenna system based on the at least one first and at least one second equalized delay values so that the downlink RF signals associated with the first channel is transmitted from each of the plurality of remote units simultaneously and that downlink RF signals associated with the second channel is transmitted from each of the plurality of remote units simultaneously.

20. The program product of claim 17, wherein the plurality of remote units comprise a first plurality of remote units of a first delay group and a second plurality of remote units of a second delay group, wherein by executing the program instructions, the at least one processor is configured to:

determine at least one first equalized delay value for the first delay group, and at least one second equalized delay value for the second delay group, and control signal transmission times of the at least one node of the distributed antenna system based on the at least one first and at least one second equalized delay values so that downlink RF signals associated with the first delay group are transmitted from each of the first plurality of remote units simultaneously and that downlink RF signals associated with the second delay group are transmitted from each of the second plurality of remote units simultaneously.

* * * * *